US008412648B2

(12) United States Patent
Karypis et al.

(10) Patent No.: US 8,412,648 B2
(45) Date of Patent: Apr. 2, 2013

(54) SYSTEMS AND METHODS OF MAKING CONTENT-BASED DEMOGRAPHICS PREDICTIONS FOR WEBSITE CROSS-REFERENCE TO RELATED APPLICATIONS

(75) Inventors: George Karypis, Minneapolis, MN (US); Eui-Hong Han, Woodbury, MN (US); Santosh Kabbur, Saint Paul, MN (US)

(73) Assignee: nXnTech., LLC, Dallas, TX (US)

( * ) Notice: Subject to any disclaimer, the term of this patent is extended or adjusted under 35 U.S.C. 154(b) by 505 days.

(21) Appl. No.: 12/643,916

(22) Filed: Dec. 21, 2009

(65) Prior Publication Data

US 2010/0223215 A1   Sep. 2, 2010

Related U.S. Application Data

(60) Provisional application No. 61/139,422, filed on Dec. 19, 2008, provisional application No. 61/233,789, filed on Aug. 13, 2009.

(51) Int. Cl.
*G06F 15/18* (2006.01)

(52) U.S. Cl. ......................................................... 706/12

(58) Field of Classification Search ...................... 706/12
See application file for complete search history.

(56) References Cited

U.S. PATENT DOCUMENTS

| | | | |
|---|---|---|---|
| 6,029,195 A * | 2/2000 | Herz | ............................. 725/116 |
| 6,831,663 B2 | 12/2004 | Chickering et al. | |
| 7,162,522 B2 | 1/2007 | Adar et al. | |
| 7,451,099 B2 | 11/2008 | Henkin et al. | |
| 2002/0091820 A1 | 7/2002 | Hirai | |
| 2004/0249700 A1 | 12/2004 | Gross | |
| 2005/0234762 A1 * | 10/2005 | Pinto et al. | ....................... 705/10 |
| 2006/0069618 A1 | 3/2006 | Milener et al. | |
| 2006/0212353 A1 | 9/2006 | Roslov et al. | |
| 2007/0073681 A1 | 3/2007 | Adar et al. | |
| 2007/0094060 A1 | 4/2007 | Apps et al. | |
| 2007/0198327 A1 | 8/2007 | Yazdain et al. | |
| 2007/0208728 A1 * | 9/2007 | Zhang et al. | ....................... 707/5 |
| 2008/0040226 A1 | 2/2008 | Roker et al. | |
| 2008/0097842 A1 | 4/2008 | Tirumala et al. | |
| 2008/0097843 A1 | 4/2008 | Memon et al. | |
| 2008/0109376 A1 | 5/2008 | Walsh et al. | |
| 2008/0126411 A1 | 5/2008 | Zhuang et al. | |
| 2008/0256065 A1 * | 10/2008 | Baxter | ............................... 707/5 |
| 2008/0281827 A1 * | 11/2008 | Wang et al. | ...................... 707/10 |

(Continued)

OTHER PUBLICATIONS

Demographic Prediction Based on User's Browsing Behavior Jian Hu, Hua-Jun Zeng, Hua Li, Cheng Niu, Zheng Chen Microsoft Research Asia 49 Zhichun Road Beijing 100080, P.R. China {jianh, hjzeng, huli, chengniu, zhengc}@microsoft.com.*

(Continued)

*Primary Examiner* — Kakali Chaki
*Assistant Examiner* — Ababacar Seck
(74) *Attorney, Agent, or Firm* — Andrews Kurth LLP

(57) ABSTRACT

Systems and methods for making demographic predictions for websites and web-pages. Embodiments include a system and a method of making demographic predictions for websites. The system and method select one or more websites with known demographic attributes for use as training websites, obtain demographic attributes data of the training websites, determine first features of web-pages of the training websites and develop a prediction model using the determined first features and the obtained demographic attributes data. The prediction model predicts one or more values for a target demographic attribute. The system and method determine second features of web-pages of a target website and apply the prediction model to the determined second features of the target website to predict one or more values for the target demographic attribute of the target website.

42 Claims, 17 Drawing Sheets

U.S. PATENT DOCUMENTS

2008/0306816 A1 12/2008 Matthys et al.
2009/0012869 A1 1/2009 Henkin et al.
2009/0018915 A1 1/2009 Fisse

OTHER PUBLICATIONS

Jian Hu, et al., Demographic Prediction Based on User's Browsing Behavior; Proceedings of the 16 Intl. Conference on World Wide Web, May 8-12, 2007; Banff, Alberta, Canada.

Eric Auchard; Men Want Facts, Women Seek Personal Connections on Web; http://www.computerworld.com/developmenttopics/websitemgmt/story/0,10801,107391p2,00.html.

Deepayan Chakrabarti, et al; Page-Level Template Detection via Isotonic Smoothing; Proceeding of the 16 Intl. Conference on World Wide Web, 2007, pp. 61-70.

Yiming Yang, et al; A Comparative Study on Feature Selection in Text Categorization; Proceedings of the Fourteenth Intl. Conference on Machine Learning, 1997, pp. 412-420.

Joachim; Text Categorization With Support Vector Machines: Learning with Many Relevant Features; Proceedings of the 10th European Conference; Germany, pp. 137-142; 1998.

S.C. Deerwester, et al.; Indexing by Latent Semantic Analysis; Journal of the American Society of Information Science; 41(6); pp. 391-407; 1990.

D. Murray, et al.; Inferring Demographic Attributes of Anonymouns Internet Users; Web Usage Analysis and User Proling Workshop, Springer; vol. 1836; pp. 7-20; 2000.

George Karypis, et al.; Better Kernels and coding Schemes Lead to Imp. In SVM-Based Secd. Structure Prediction; Web Usage Analysis & Users Proling Workshop, vol. 1836; 2005.

Huzefa Rangwala, et al.; Building Multiclass Classiferes for Remote Homology Detection and Fold Recognition; Journal of BMC Bioinformatics; 2006; vol. 7; p. 455.

G. Salton, et al.; A Vector Space Model for Automatic Indexing; Information Retrieval and Language Processing; Communications of the ACM, vol. 18; No. 11; Nov. 1975.

K. Pearson; On Lines and Planes of Closet fit to Systems of Points in Space; Philosophical Magzine 2; pp. 559-572.

A.P. Dempster, et al.; Maximum Likelihood form Incomplete Data via the EM Algorithm; Journal of the Royal Statistical Society; vol. 39; No. 1; pp. 1-38; 1977.

E. Michailidou, et al.; Visual Complexity and Aesthetic Perception of Web Pages; 26th ACM Intl. Conference on Design of Communication; Lisbon, Portugal; Sep. 22-24, 2008.

E.H. Moore, et al.; On the Reciprocal fo the General Algebraic Matrix,; Bulletin of the American Mathematical Society 26; pp. 385-396.

R. Penrose; A Generalized Inverse for Matrices; Proceedings of the Cambridge Philosophical Society 51; pp. 406-413.

\* cited by examiner

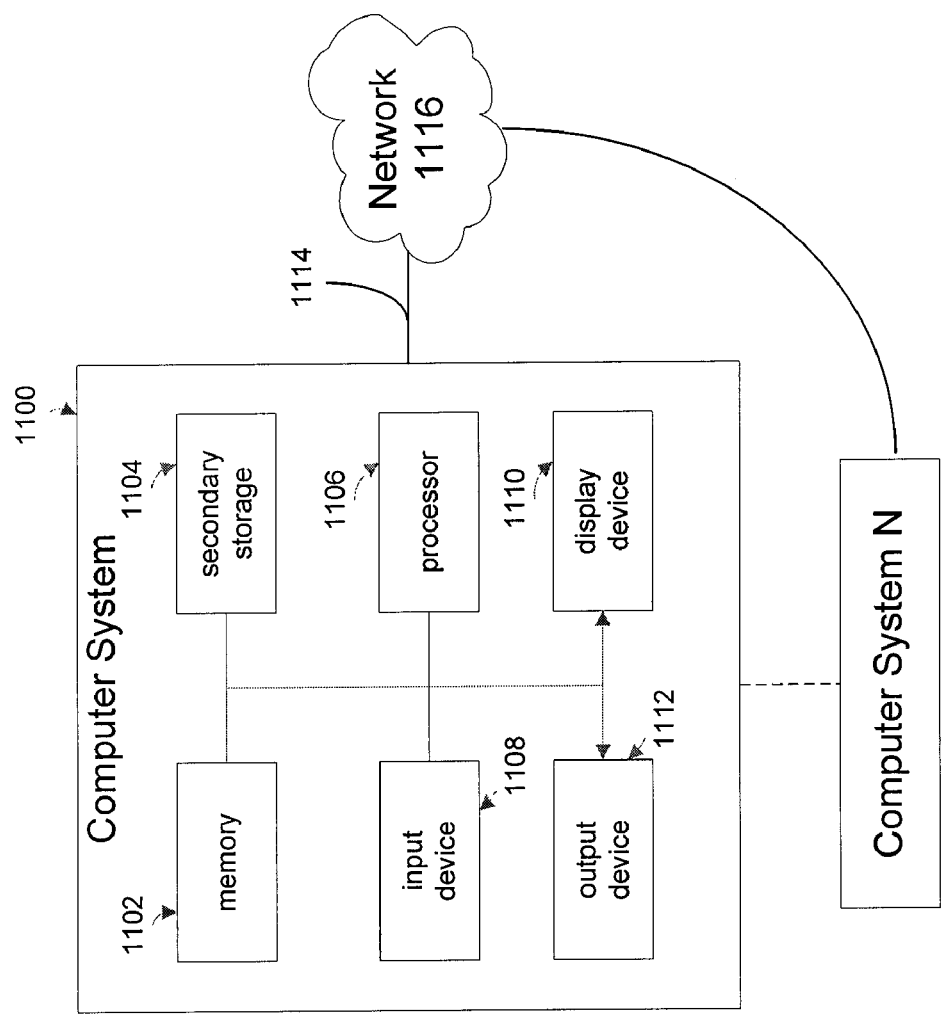

SYSTEMS AND METHODS OF MAKING CONTENT-BASED DEMOGRAPHICS PREDICTIONS FOR WEBSITE CROSS-REFERENCE TO RELATED APPLICATIONS

CROSS-REFERENCE TO RELATED APPLICATIONS

The present application claims priority under 35 U.S.C. 119(e) of U.S. Provisional Patent Application No. 61/139,422, filed on Dec. 19, 2008, and U.S. Provisional Patent Application No. 61/233,789, filed on Aug. 13, 2009, the disclosures of which are expressly incorporated by reference herein in their entirety.

BACKGROUND

Demographics play an important role in web advertising, web searching and generally the personalization of web applications. Applications like web search engines might adjust the ranking of search results based on the demographic attributes of a user like age, gender and occupation. Another important domain where demographics play an important role is online advertising. With the growth of web usage, online advertising is growing rapidly in recent years. In particular, contextual advertising is becoming popular. Behavior targeting using demographic attributes helps advertisers to target specific users with demographic relevant advertisements.

One approach to obtain demographics of a website is through panel studies similar to that of TV program rating. In this approach, panels with known demographic information are recruited and their browsing histories are recorded. These browsing histories of panels with different demographic attributes are used to compute demographics of websites. However, this approach requires impractically large sizes of panels to guarantee any reasonable coverage of websites. Additionally, if a site is not visited by any of the panels, then the demographics of the website cannot be estimated.

Another approach to obtain demographics of a particular website is by using information provided by that website's registered visitors or by asking some of its visitors to participate in online surveys. These techniques capture information only about the limited subset of visitors that have chosen to register and/or participate in the surveys. In addition, since not all segments of a website's visitors are equally likely to participate in the above activities, the resulting information is subjected to a sampling bias. Furthermore, since each individual can potentially register and/or take the surveys multiple times, the demographics obtained via this approach may not be accurate. Additionally, since the information provided by the visitors during registration or during their participation in surveys can potentially be used to describe and/or identify them, their use for any other purpose other than the one intended, represents a potential intrusion upon a user's expectation of privacy.

Another approach is to build a computational or statistical model to predict a website's demographic information. The existing approaches for building such models use data obtained by tracking users' browsing behavior across different websites, information about the content of the web-pages that the users visit, and information associated with the users' profile. The profile of a user (or a group of users) is often constructed by integrating various elements across different websites and contains information related to any data provided during registration, web-pages viewed, products purchased, advertisement clicked, etc. With the growing concern regarding privacy on the Internet, people are reluctant to share their personal data, and therefore, the applicability of existing approaches relying on such personal data can be limited.

Due to the combination of the above factors, and other factors, the methods in use today for characterizing the audience characteristics of websites are limited in their accuracy, their ability to cover a large number of websites with substantial audience traffic, and the failure to protect a user's right to information privacy.

SUMMARY

Systems and methods provide many advantages over the prior art. Embodiments include a system and method of making demographic predictions for websites and/or web-pages. The system or method selects one or more websites with known demographic attributes for use as training websites, obtains demographic attributes data of the training websites, determines features of web-pages of the training websites and develops a prediction model using the determined features of web-pages of the training websites and the obtained demographic attributes data. The prediction model predicts one or more values for a target demographic attribute. The system or method determines features of web-pages of a target website and applies the prediction model to the determined features of web-pages of the target website to predict one or more values for the target demographic attribute of the target website.

Embodiments further include a system and method of making demographic predictions for websites. The system or method includes developing a prediction model using extracted features and demographic attributes data of a set of training websites, determining features of web-pages of a target website, and applying the prediction model to the determined features of the target website to predict one or more values for the target demographic attribute of the target website.

Embodiments further include a system and method of making demographic predictions for websites. The system or method identifies one or more websites with known demographic characteristics as training websites and compares a first set of features of the training websites to a second set of features of one or more target websites.

Embodiments further include a system and method of making demographic predictions for websites that may obtain demographic attributes data of a set of training websites, determine first features of web-pages the set of training websites, correlate the determined first features of web-pages the set of training websites and the obtained demographic attributes data of the set of training websites, determine second features of web-pages of a target website, and predict values of a second demographic attribute of the target website based on the correlating.

Likewise, embodiments include a computer readable medium comprising instructions stored thereon that may be executed by a computer for making demographic predictions for websites without using user information for the websites by developing a prediction model using extracted features and demographic attributes data of a set of training websites, determining features of web-pages of a target website, and applying the prediction model to the determined features of the target website to predict one or more values for the target demographic attribute of the target website.

Additionally, embodiments include a system for making demographic predictions for websites. The system may include a processor, a memory, and a network connection for connecting to a network and accessing training and target websites. The memory includes instructions stored thereon that are executed by the processor for making content-based demographic predictions for websites without using user information for the websites by developing a prediction model using extracted features and demographic attributes data of a set of training websites, determining features of web-pages of the target website, and applying, utilizing the processor, the prediction model to the determined features of the target website to predict the target demographic attribute of the target website.

DESCRIPTION OF THE DRAWINGS

The detailed description will refer to the following drawings, wherein like numerals refer to like elements, and wherein:

FIG. 11 is a diagram of an embodiment of a computerized system for implementing embodiments of the systems for and methods of making content-based demographic predictions for websites.

DETAILED DESCRIPTION

Figure 1:
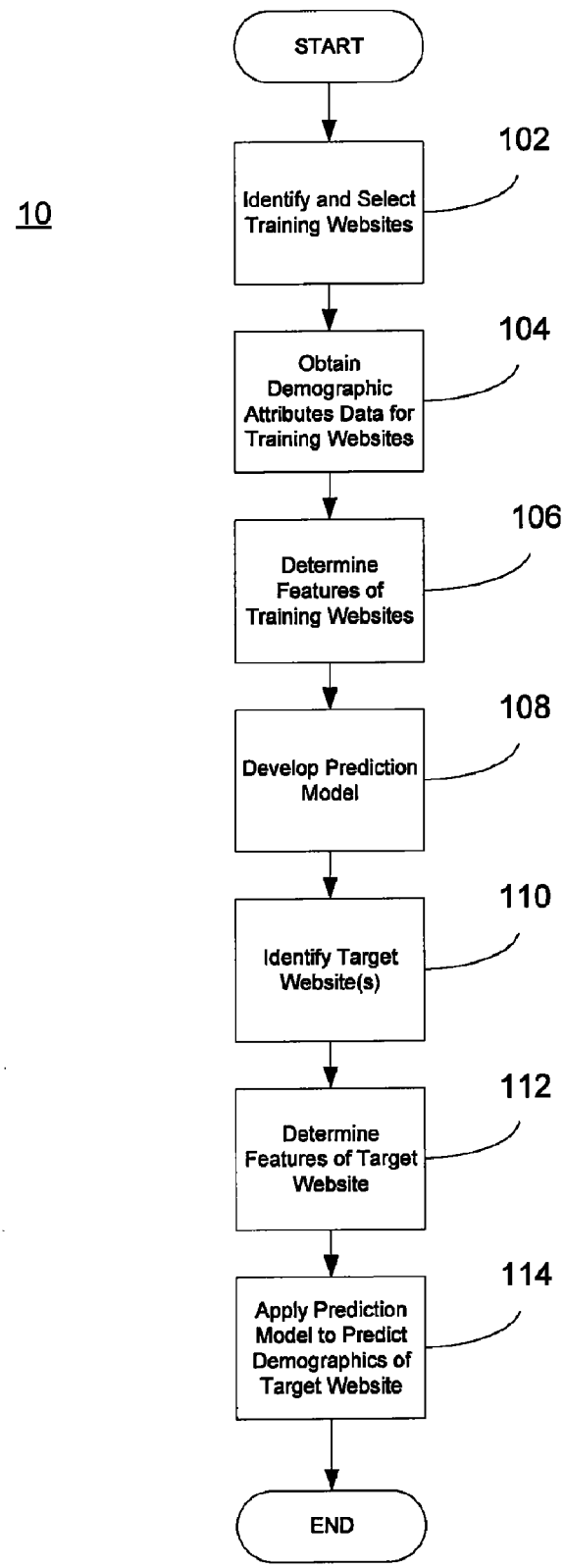
FIG. 1 is a flowchart illustrating an embodiment of a method of making content-based demographic predictions for websites.

Described herein are systems for and methods of making content-based demographic predictions for websites. Embodiments predict demographic attributes of websites based solely on the content of the websites. As used herein in, embodiments of the systems and methods, a website's content may include many features that may be extracted from the website's web-pages, including the textual features of the website's web-pages, the structural features of the website's web-pages, the type and category of the website, the intra- and inter-web-page and website linkage structure, the features of web-page(s) and website(s) linked to by the website's web-pages, the hyper-text markup language ("HTML") of the website's web-pages, the HTML of a subset of the web-pages that link to the website's web-pages (in-links) (both from the same website or different websites), and the HTML of the web-pages that are linked by the website's web-pages (out-links) The predicted demographic attributes of a website are the expected demographic attributes of the users of the website, typically expressed as a percentage of users that have a particular demographic characteristic or fall within a particular demographic (e.g., a prediction that 55% of a website's users will be male, 45% female). Note, throughout this application, the persons that visit a website or a web-page are referred to as users, visitors, people, persons, audience, and in other manners. It is to be understood that these terms are used interchangeably and should be understood to mean the persons, whether individually or collectively and in the broadest sense, that access one or more web-pages of a website or a specific web-page, e.g., via navigating to the URL of the web-page(s) on an Internet browser on a computer, mobile device, etc.

Embodiments avoid disadvantages of the prior art, including without limitation the prior art disadvantages of relying on or requiring the use of data obtained directly or indirectly from the visitors of a website to predict the demographic attributes of the website. Instead, the systems and methods predict the demographic attributes of websites using only the content of the web-pages of the websites and without using the browsing behavior or browsing history of the websites' visitors or the visitors' click-through data.

Any demographic attribute may be predicted using embodiments of the systems and methods described herein. Gender, age distribution, income distribution, nationality, language, etc., are all examples of demographic attributes that may be predicted. Even though the systems and methods described herein may be used to predict a wide range of demographic attributes, examples provided herein focus on methods to predict the gender and age distribution of a website's audience/users. As used herein, the gender attribute specifies the male and female percentages of a website's audience, whereas the age attribute provides a break-down of a website's audience in different age groups. Table 1 below shows the five age groups that used in the examples provided herein.

TABLE 1

| Age Group | |
|---|---|
| Group Name | Age (in years) |
| Kid | 3-12 |
| Teen | 13-17 |
| Young Adult | 18-34 |
| Adult | 35-49 |
| Old | 50+ |

Embodiments of the system and method for predicting a website's demographic attributes follow a supervised learning framework. Within this framework, a set of websites with known demographic attributes are used as a training set, a set of features for these websites or for a subset of the web-pages wherein is extracted, and a model is learned or developed to predict the demographic attributes of a website based on these features. Features for the training websites and for the websites or web-pages whose demographic attributes are being predicted (target websites or web-pages) are extracted from the content of the web-pages of these websites. The prediction model is applied to the extracted features, in effect comparing features of target websites or web-pages to features from training websites and predicting demographic attributes based thereon.

A key characteristic of the underlying prediction problem is that demographic attributes that need to be predicted are probability distributions that take a discrete set of values. This is different from most traditional value estimation problems that focus on building models to estimate a single value. Note that for those demographic attributes that take only two values (e.g., gender), the distribution prediction problem can be transformed to a single-value prediction problem, by predicting only one of the two values and estimating the other from that prediction. For example, if x % is the percentage of a website's audience that is male, then the percentage of the female audience can be estimated as (100-x) %.

Embodiments of the system and method may perform two overall activities. First, embodiments may use standard regression-based techniques to estimate each discrete value of a demographic attribute by treating the prediction problem as an independent single-value estimation problem. In embodiments, prediction models may be generated, e.g., using regression-based techniques, and then predictions generated by inputting target website content features into the prediction models. The prediction models may be generated using various techniques, including without limitation support vector regression, linear regression, logistic regression, non-linear regression, nonparametric regression, probabilistic estimations and Markov random fields.

Second, embodiments may use these individual predictions as input to a second learning problem whose goal is to estimate the overall distribution of the demographic attribute. In these embodiments, the individual models may be estimated using regression-based techniques (e.g., support vector regression), whereas the individual estimations may be coupled using an approach that is designed to predict a multidimensional vector such as the matrix approximation, as described below.

In embodiments described herein, the prediction models are generated using support vector regression (SVR). Support vector machines (SVMs) are an implementation of SVR that may be used to generate prediction models. A specific implementation of SVM, known as "SVMlight," may be used to generate the prediction models and predict the demographic attribute values in embodiments. Such an implementation is described in, e.g., http://svmlightjoachims.org/. See also, e.g., Joachims, T., *Text Categorization with Support Vector Machines Learning with Many Relevant Features*, In Proceedings of the 10th European Conference on Machine Learning (ECML), Chemnitz, Germany, 137142 (1998), which is incorporated by reference herein, for a general description of SVM.

With reference now to FIG. 1, illustrated is an embodiment of a method 10 of making content-based demographic predictions for websites. Method 10, and the other methods described herein, may be a computer-implemented method. Accordingly, the steps of method 10, and the other methods described herein, or a subset of those steps, may be executed by a computer. The computer may be a general purpose computer that includes a processor and memory that runs a computer program or other set of instructions that may be stored in the memory and programmed to perform the method steps when executed by the processor. The computer may be a special purpose computer specifically programmed to perform the method(s) described herein.

Method 10 identifies and selects websites with known demographic attributes, block 102. The websites with known demographic attributes may be thought of or referred to as training websites. The content of a subset of the web-pages from these training websites, and the training websites' demographic attributes data, are used by method 10 to develop the prediction model. The training websites may be identified based on input from a user, automated analysis of a set of websites with known demographic attributes received from commercial providers of such data for websites (including, for example, without limitation, Nielson Online (see http://en-us.nielsen.com/tab/product_families/nielsen_netratings), Alexa (see www.alexa.com/topsites), Quantcast (see http://www.quantcast.com) and Comscore (see http://www.comscore.com)), a combination of these or other manners. The training websites for use in method 10 may be selected based on various factors, such as size of a website's audience, the website's gender or age (or other demographic) distribution (e.g., to attempt to achieve a balance of training websites), the reliability, if known, of demographic attributes data, etc. For example, method 10 may select a group of 450 websites, with a balanced distribution of gender and age demographics, of the top 2000 most visited websites provided by a commercial provider or providers of website demographic attributes data.

If not already gathered or obtained as part of selecting 102 the training websites (e.g., if training websites were selected at least in part based on actual demographic distributions, then such demographic attributes may have been fetched as part of selecting 102), the demographic attributes data of the identified and selected training websites is gathered or obtained, block 104. The demographic attributes data may be gathered or obtained from various sources; for example, the demographic attributes data may be obtained from commercial providers of demographic data for websites such as Nielson Online, Alexa, Quantcast, and Comscore. The demographic attributes data may include data for just one demographic attribute, such as age, or for a plurality of demographic attributes.

Method 10 determines features of web-pages of the training websites from the content of the web-pages, block 106. In embodiments, determining 106 may obtain the content of the web-pages and then extract features from the obtained content. Different features may be extracted from the same content. As noted above, a website's content may encompass many features that may be extracted from the web-pages of the website.

In embodiments, web-page features include a plurality of types of web-page features that may be extracted from the training website web-pages. The determining 106 may determine features from all or a subset of the web-pages of the training websites. One such feature captures a web-page's textual content (e.g., terms), while another feature captures the web-page's structure (e.g., organization, style, sections (e.g., forums, FAQs, etc.)). Other features that may be determined include the type and category of the website (e.g., corporate site, entertainment site, issue site, shopping site, social networking site, blogging site, health site, etc.), the intra- and inter-web-page and website linkage structure (e.g., links between web-page sections, links between the web-page and another web-page for the same website, links between the web-page and a web-page of another website), the features of the web-page(s) and website(s) linked to by the web-page, the HTML of the website's web-pages, the HTML of a subset of the web-pages that link to the website's web-pages (in-links) (both from the same website or different websites), and the HTML of the web-pages that are linked by the website's web-pages (out-links) In embodiments, a web-graph including the training websites and websites with web-pages in-linked or out-linked from training website web-pages may be generated. A web graph is a set of vertices u and v and edges, the vertices corresponding to websites and one of the edges being a directed edge (u, v) between two websites if there are web-pages in the website corresponding to vertex u that link to web-pages in the website corresponding to vertex v. Websites that are linked to by training websites, or which link to training websites, may be referred to as web-graph neighbors of the training websites. In embodiments described herein, these features are determined entirely by analyzing the web-pages themselves and do not rely on any information about the users visiting the corresponding web-pages and websites. This is done by design, as one of the primary features of embodiments of the systems and methods is the accurate prediction of the demographic characteristics of a website's audience without relying on any data that directly or indirectly intrudes on the website's users' private information. The determination 106 of the content is described in more detail below.

The content of the web-pages may be obtained using a web-page crawler, robot or similar feature extraction tool or process, such as, e.g., the Heritrix Crawler (see crawler.archive.org). The same or other tools may extract the desired features from the obtained content. The content that may be obtained by the web-page crawler or other tool may include the in-linking and out-linking features described above. For example, a web-page crawler or other tool may identify links to other web-pages from a training website web-page, follow the links to the linked web-pages, and obtain the HTML from the linked web-pages and extract different features from this HTML. The web-page crawler may also obtain in-linking features in a similar manner.

Using the determined features and obtained demographic attributes, the prediction model is developed, block 108. In embodiments, SVR is used to develop a function $f$ (a prediction) given the following inputs: the determined features of a subset of the web-pages of the training websites, a web-graph that contains both the training websites and other websites that are not part of the training set, and the obtained/gathered demographic attribute(s) data of the training websites. The function $f$ will predict/estimate the demographic attribute(s) of a website (or web-page). During prediction, the function $f$ (the prediction model) will predict/estimate a discrete value demographic attribute of a target website (or web-page) based on the input of the determined content of the target website(s) (or web-page(s)). Developing the prediction model and using it to predict/estimate a demographic attribute are described in more detail below.

With continuing reference to FIG. 1, method 10 identifies a website or websites with unknown demographics for demographic prediction, block 110. The unknown or target website or websites may be identified for demographic prediction for a variety of reasons. For example, an advertiser may want to obtain a demographic prediction for a website to determine whether an advertisement on the website would likely reach an audience with the desired demographics. Once the target website or websites are identified, the content of web-pages of the target website (or websites) is determined and the set of features for these web-pages is determined/extracted from their content, block 112. Method 10 may determine 112 the same web-page features as determined for the web-pages of the training websites, or a subset thereof. Likewise, the determining 112 may only extract features from a subset of a target website's web-pages. After determining 112 the features of a subset of the web-pages of the target websites, method 10 applies the prediction model to the determined features of the target website's web-pages to predict the demographics of the target website, block 114.

With reference now to FIGS. 2A-2E, illustrated is an embodiment of a method 200 of determining/extracting features of a web-page from the web-page content that may be used in embodiments of systems and methods of making content-based demographic predictions for websites. Determining 106, 112 the features of the web-pages of the training and target websites may include performing all or a portion of the embodiment of method 200 illustrated in FIGS. 2A-2E. Likewise, method 200 illustrated in FIGS. 2A-2E may be repeated for all or a subset of the web-pages of each training and target website. As described above, method 200 may determine various web-page features, including, without limitation, textual features, structural features, type and category of the web-page, the intra- and inter-web-page and website linkage structure, and the content-derived features of the web-page(s) and website(s) linked-to and linked-by the web-page (i.e., web-graph neighbors), etc.

Figure 2A:
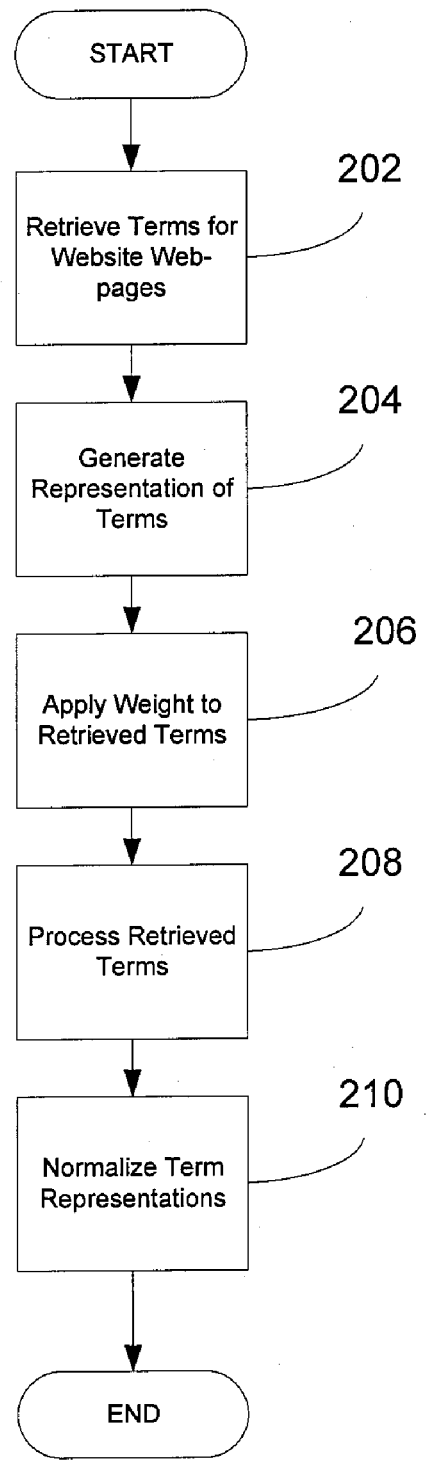
FIGS. 2A-2E are flowcharts illustrating an embodiment of a method of determining website content that may be used in embodiments of systems and methods of making content-based demographic predictions for websites.

With reference to FIG. 2A, method 200 determines the textual features of a web-page. To determine the web-page's textual features, embodiments of method 200 retrieves terms from the web-pages, block 202, and generates a representation of those terms, block 204. The retrieved terms may include terms that appear on the web-pages, terms that appear in the web-pages that link-to these web-pages, and terms that appear in the web-pages that are linked-by the web-pages. The retrieving 202 may use known processes and/or tools to scan the web-pages and extract/retrieve the terms from the web-pages. Generating 204 may include generating a representation of the retrieved terms using a vector-space model for information retrieval, such as the popular vector-space model from information retrieval described in Ricardo Baeza-Yates and Berthier Ribeiro-Neto, *Modern Information Retrieval*, Addison-Wesley Longman Publishing Co., Inc., Boston, Mass., 1999, which is hereby incorporated by reference. In this model, each web-page is represented as a sparse term vector in the space of the distinct terms that exist in the collection. The non-zero entries of that term vector correspond to the terms that are present in the web-page. Each non-zero entry may be equal to the number of occurrences of a corresponding term in the web-page.

Method 200 may apply a weight to the retrieved terms, block 206. Method 200 may use a standard Term Frequency Inverse Document Frequency (TF-IDF) team weighting scheme that assigns a weight to each term that is linearly related to the term's occurrence frequency in the web-page and inversely related to the number of web-pages in the website on which the term occurs, to weigh 206 the retrieved terms. The TF-IDF term weight is a statistical measure used to evaluate how important a word is to a document (e.g., a web-page) in a collection or corpus (e.g., all of the web-pages in the website). For each term, the term frequency is the number of times that word appears in a web-page, whereas the term's document frequency is the number of web-pages in which the term occurs. The importance increases proportionally to the term's term frequency but is offset by the term's document frequency (i.e., terms that appear in many web-pages become less important). In an embodiment of this method, the size of the document collection (i.e., web-pages) used in the IDF component when determining 106 the content of the training websites is equal to the number of web-pages across the entire set of training websites. In another embodiment, the size of the document collection is normalized so that each website contributes an equal weight to the overall collection. The normalization may be done by assigning a weight to each web-page of the ith website that is $1/n_i$, where $n_i$ is the number of web-pages from the ith website that exist in the collection.

With continuing reference to FIG. 2A, method 200 may process the retrieved terms, block 208. For example, following standard information retrieval practices, the retrieved terms may be processed 208 to eliminate terms and transform terms. Processing 208 may use a stop list to eliminate certain unimportant words and use Porter's stemming algorithm to transform each term to its stem. Likewise, in order to reduce the dimensionality of the feature space and improve the generalization of resulting models, processing 208 may further eliminate terms that occur in less than a certain percent, e.g., ten percent (10%), of the total number of web-pages. If a vector space model is used to model the terms of a web-page, the web-page's terms are represented as a term vector, method 200 may also normalize the web-page's term vector to be of a unit length, block 210. A term vector may be normalized to a unit length by dividing all of the components (all of the non-zero entries representing present terms not eliminated by processing 208) by the original length of the term vector. The normalized term vector may be referred to as the T representation of the web-page.

A challenge associated with extracting the textual features of modern web-pages is that in addition to the portions of the web-pages that contains information specific to those web-pages, web-pages also contain additional information that is irrelevant to the information that they provide. Such examples include but are not limited to headers, footers, navigation panels, and advertisements. Quite often, the portion of a web-page's text and HTML elements that is directly related to the web-page's specific information is much smaller than that occupied by the irrelevant portions. To address this problem, embodiments of method 200 of determining the web-page textual features may identify a web-page's specific information by collectively analyzing the entire set of web-pages that were obtained from the same website, determining the irrelevant information or form HTML elements and removing the irrelevant information or form HTML elements from consideration.

Figure 2B:
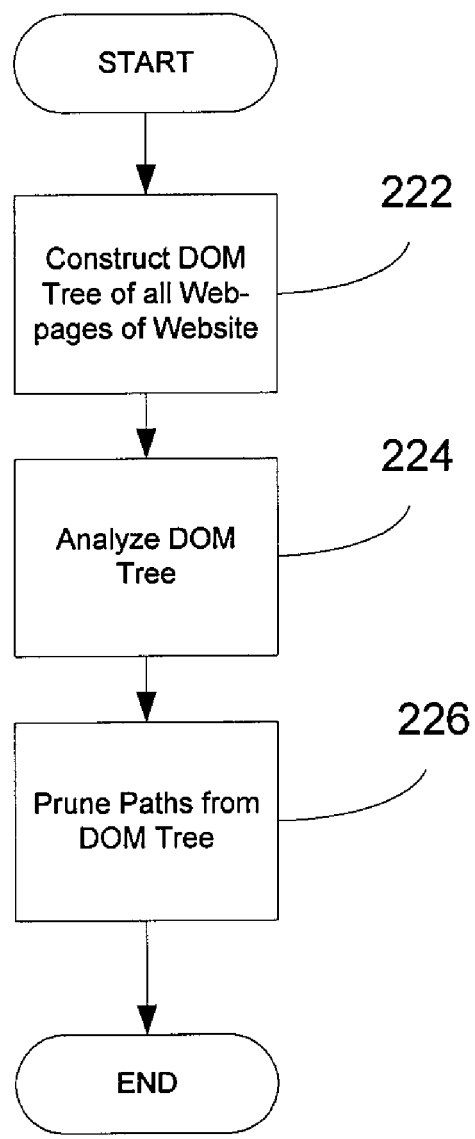

With reference now to FIG. 2B, shown is an embodiment of a method of determining irrelevant or form content of website, which may be included as part of method 200. The method of determining irrelevant or form content of website is related to template identification methods used by web search engines to determine parts of web-pages that the web search engine indexes. See, e.g., D Chakrabarti, R Kumar, K Punera, *Page-level Template Detection via Isotonic Smoothing*, Proceedings of the 16th International Conference on World Wide Web, 2007, pp 61-70, which is hereby incorporated by reference. Given a set of web-pages that belong to the same website, the method may construct a Document Object Model (DOM) tree of all the web-pages in the website, block 222 (other representations of web-pages may be used instead of DOM trees; the DOM tree representation enables a method to easily compare web-pages to determine common, repetitive terms). The DOM is an application programming interface (API) for valid HTML and well-formed XML documents (e.g., web-pages). DOM defines the logical structure of documents and the way a document is accessed and manipulated. In the DOM, documents have a logical structure that is represented via a rooted tree. For instance, consider this table, taken from an HTML document:

```
<TABLE>
<TBODY>
<TR>
<TD>Shady Grove</TD>
<TD>Aeolian</TD>
</TR>
<TR>
<TD>Over the River, Charlie</TD>
<TD>Dorian</TD>
</TR>
</TBODY>
</TABLE>
```

TABLE 2

HTML TABLE
A graphical representation of the DOM of the example table is:

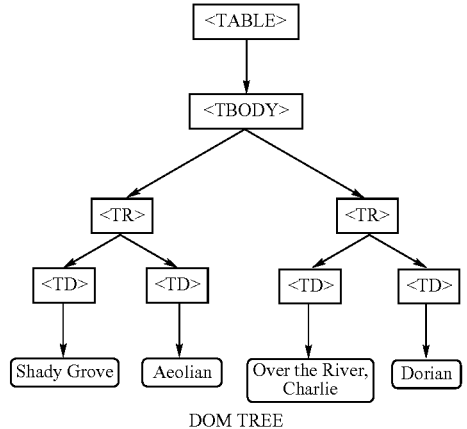

DOM TREE

After constructing 222 a DOM tree, similar to the DOM tree shown above, for all the web-pages on the website, the method may analyze the DOM trees, block 224, and eliminates all the paths from the leaves to the root of the DOM tree that occur in some defined number (e.g., at least ten (10)) or percentage (e.g., five percent (5%)) of the DOM trees (i.e., in the defined number of web-pages on the website), block 226. The motivation behind this approach is that elements of each web-page that are common across different web-pages will correspond to non-web-page specific content, such as web-page template terms, and, therefore, may be eliminated. By eliminating paths from the leaves to the root of the DOM tree, such text that is common and not web-page specific text may be eliminated. A sufficiently high-defined number or percentage is used to avoid inadvertently eliminating relevant terms. The text associated with the leaf nodes of a web-page's DOM tree that are not pruned, and the terms within that text, may then be used to generate 204 the term vector T of the web-page's vector-space representation, as illustrated in FIG. 2A.

Figure 2C:
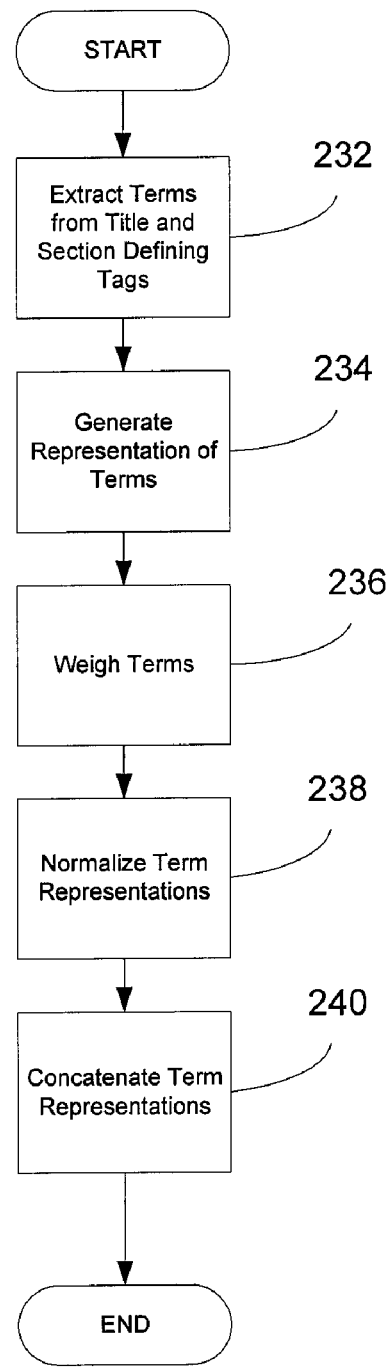

In addition to the above web-page-specific textual content, embodiments of method 200 of determining web-page features may also use the semi-structured nature of HTML documents to emphasize terms that occur in certain HTML tags on the web-pages. With reference now to FIG. 2C, shown is an embodiment of a method identifying relevant web-page HTML tag terms, which may be included as part of method 200. Embodiments of the method identifying relevant web-page HTML tag terms may focus on the title and section-defining tags (header tags) (i.e., the TITLE and H1-116 tags, respectively of HTML documents) and separately models the terms that these tags contain (e.g., as a separate term vector). Accordingly, method of identifying relevant web-page HTML tag terms extracts terms from title and section defining tags of each web-page, block 232, and generates a representation of these terms, e.g., as a term vector in the vector-space model, block 234. Method of identifying relevant web-page HTML tag terms may further apply a weighting to the tag terms in the term vector, e.g., using the TF-IDF weighting scheme to determine the weights of each term, block 236. The resulting term vector may be normalized to be of unit length, block 238. This normalized tag term vector may be referred to as the H representation of the web-page tag terms. In embodiments, the title and header tags are extracted only from the parts of the web-page's DOM tree that are not pruned. In embodiments, each web-page may be represented as the concatenation of the original term and this new (tag term) representations (e.g., term vectors). As such, a web-page's textual features may be obtained by concatenating the original term representation, e.g., term vector T, and the tag term representation, e.g., term vector H, block 240. The concatenated term vectors may be referred to as the TH representation of the web-page. In embodiments, the relative importance of the two components may be controlled by multiplying the T and H vectors with non-zero weights prior to concatenation. The greater the weight used to multiply the vector, the greater the vector's importance.

In addition to determining textual features of web-pages, determining web-page features according to embodiments of systems and methods of making content-based demographic predictions for websites may also include determining structural features of the web-pages. Specifically, systems and methods of making content-based demographic predictions for websites may also extract features from web-pages of a website that capture the web-page structure by focusing, among others, on characteristics that relate to the web-page's style and organization. In embodiments, the structure of each web-page may be measured in terms of the web-page's visual appearance. The visual appearance of a web-page greatly influences the way a user interacts with the web-page and the type of users that the web-page attracts. As a result, the existence of certain structural elements can provide valuable clues as to the demographics of a web-page's users (or its indented users).

Figure 2D:
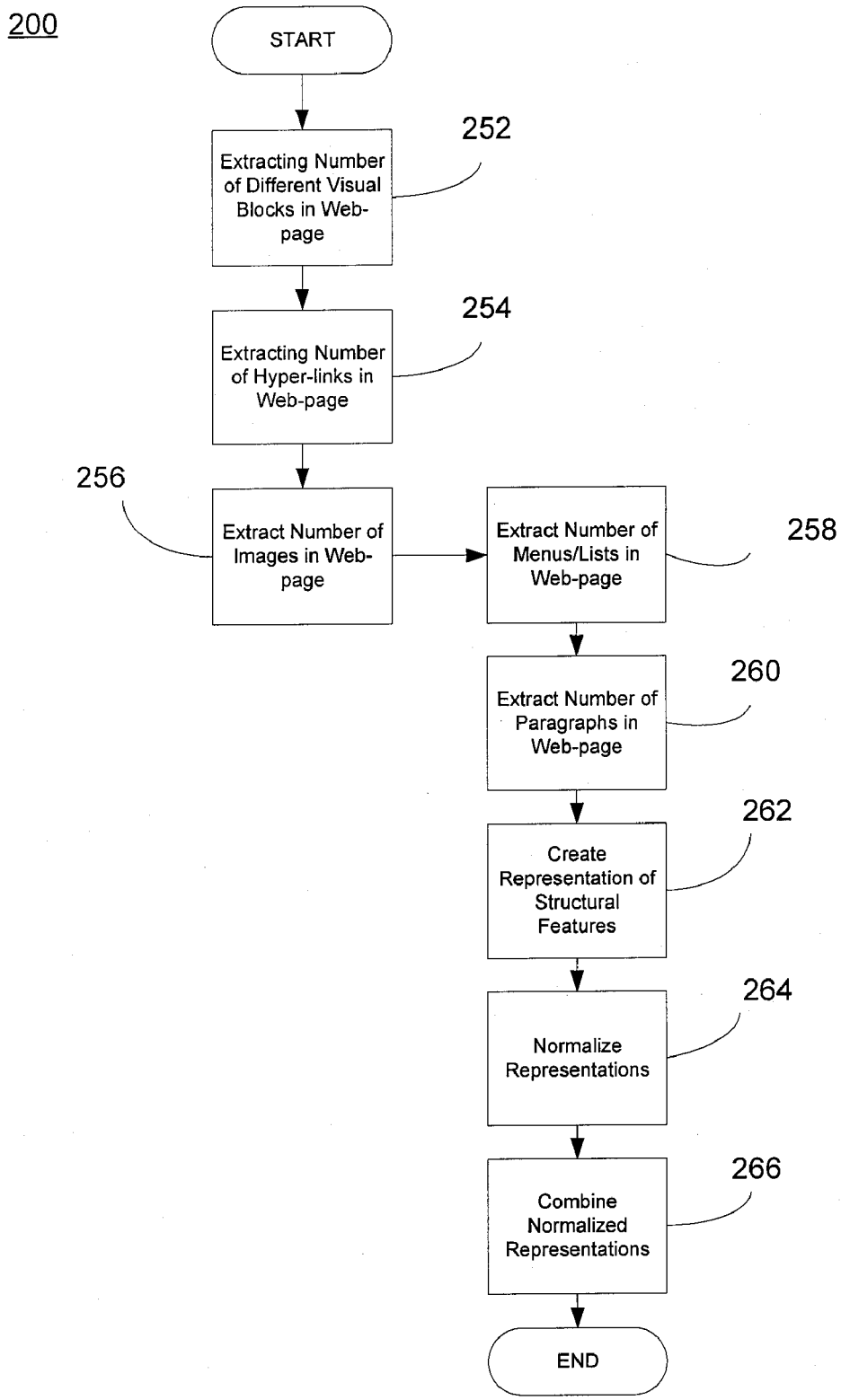

Accordingly, with reference now to FIG. 2D, illustrated is an embodiment of a method of determining the structural features of a web-page, which may be included as part of method 200 or performed separately. Determining 106, 112 the features of the training and target web-pages may include performing all or a portion of the embodiment of method illustrated in FIG. 2D. As shown, method of determining the structural features of a web-page may include extracting the number of different visual blocks in the web-page, block 252, extracting the number of hyperlinks in the web-page, block 254, extracting the number of images in the web-page, block 256, extracting the number of menus/lists in the web-page, block 258, and extracting the number of paragraphs in the web-page, block 260. The method may extract this information by counting the corresponding HTML tags like DIV, TABLE, H1-H6, A, IMG, LI, etc.

Embodiments of method of determining the structural features of a web-page extract these features from the entire web-page and not only from the portions of the web-page that were used to derive textual features (e.g., see FIG. 2B). In embodiments, these structural features are used as additional features to augment the term-vectors extracted from the web-page's specific content. Consequently, method of determining the structural features of a web-page may also include creating a representation of these structural features, e.g., a vector that includes the extracted structural features, block 262, normalizing the structural feature vector (which may be referred to as the S vector) to be of unit length, block 264, and appending the normalized structural feature vector S to the vector of the web-page's TH representation, block 266. The combined web-page feature vector may be referred to as the THS representation of the web-page.

Other content features of a web-page may also be determined by embodiments described herein. For example, embodiments may determine the type and/or category of a web-page. Such information may be determined from third-party services that categorize websites or web-pages, from metadata, web-page title or other textual features on the web-page or through other techniques known to those of skill in the art. In addition, embodiments may determine additional features for a web-page by analyzing the content of the web-pages that link-to that web-page or the web-pages that are being linked-by the web-page. These features may be textual features extracted by using method 200 of FIG. 2A or any of the other types of features described earlier. Embodiments may extract the textual or other features of the web-pages that link-to or are linked-to by the web-page for which the features are determined by analyzing the text that appears in the vicinity of the hyperlink(s) that link-to the web-page whose features are determined. These additional feature vectors may be appended to the feature vector of the entire website (e.g., $S_i$—see below) or separately to the feature vectors of the web-pages (e.g., to the THS vector). Different weights can be assigned to the different feature vectors prior to concatenation in order to control the relative importance of the different types of features. Embodiments of the method may also use some of these features (e.g., the type and/or category) to determine the prediction model.

Figure 2E:
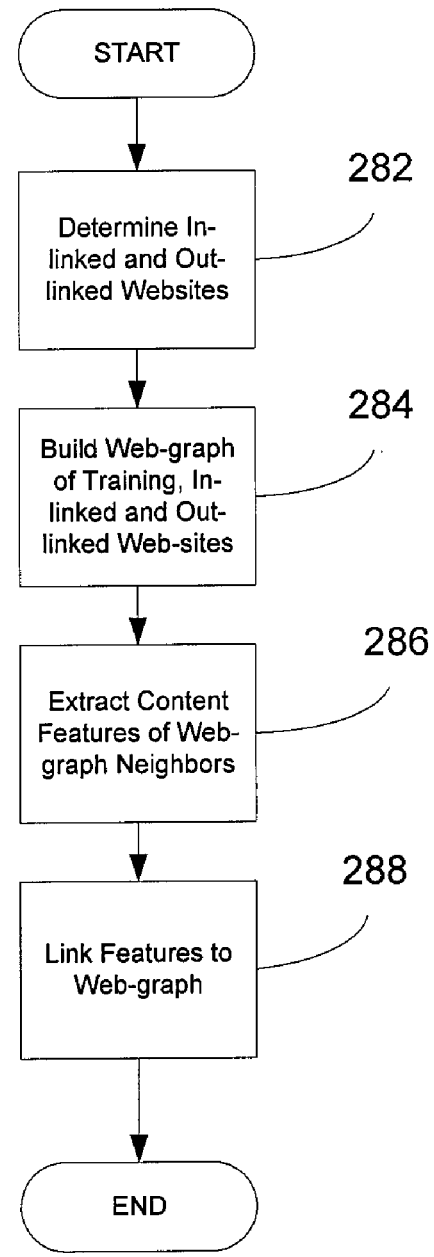

With reference now to FIG. 2E, method 200 is shown to include determining website in-linked and out-linked websites, block 282. Determining 282 may be performed by using a web-crawler or other tool to determine websites, or a subset thereof, that have web-pages linking to a web-page(s) (in-links) of the websites (e.g., training and/or target). Determining 282 may also extract out-links from the websites' web-pages or subset thereof. Method 200 may further build a web-graph of the websites and the in-linked and out-linked websites, block 284. Collectively, such in-linked and out-linked websites may be referred to as web-graph neighbors of the websites. Method 200 may further extract content features of web-pages of the web-graph neighbor websites, block 286, e.g., as described above with reference to FIGS. 2A-2D. Method 200 may link the extracted features to the web-graph, block 288.

Figure 3A:
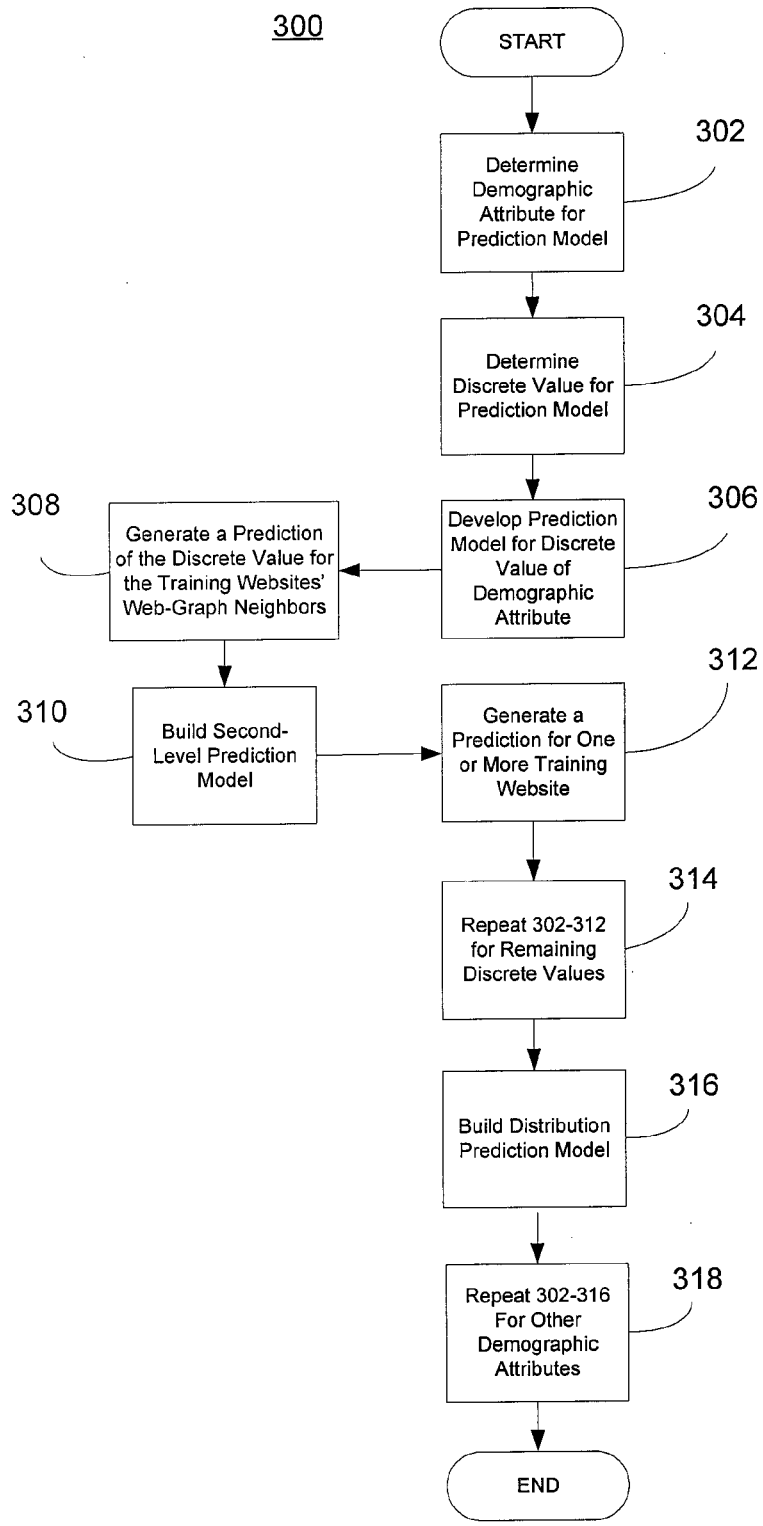
FIGS. 3A-3C are flowcharts illustrating an embodiment of a method of developing a prediction model that may be used in embodiments of systems and methods of making content-based demographic predictions for websites.

With reference now to FIG. 3A, shown is an embodiment of a method 300 of developing a prediction model. As described above, embodiments of the systems and methods described herein use the extracted features of a subset of the web-pages of the training websites and the obtained demographic attribute(s) data for the training websites to develop a prediction model. Each prediction model may be for a single demographic attribute or a plurality of demographic attributes. Likewise, prediction models may be developed for one or more values of the demographic attribute or attributes. In the embodiment described with reference to FIG. 3A, the prediction model is for a single demographic attribute and a single value of that demographic attribute. The prediction models may be developed through regression, such as through SVR. When such a regression model is developed for a single value of a multi-valued demographic attribute (e.g., the child value of the age attribute—see Table 1), embodiments include methods for combining such single-value regression models (referred to as uni-variable regression models) in order to predict a distribution for the multiple-values.

Developing 108 a prediction model, as seen in FIG. 1, may include performing all or a portion of the steps of method 300. Method 300 may determine a demographic attribute, or attributes, for which to develop prediction model, block 302, and may determine a discrete value (e.g., kids, male, etc.) of the determined demographic attribute for the prediction model, block 304. Using the extracted/determined feature vectors and the obtained demographic attribute(s) of the training websites, method 300 develops a prediction model for the determined discrete value(s) of the determined demographic attribute(s), block 306. In embodiments described herein, the prediction model is a function that provides a prediction p of the determined discrete demographic attribute value based on a website (or web-page) having certain content (e.g., having certain textual features and/or structure features as described above). The content of the web-pages or a subset of the web-pages for the website for which the prediction is to be made may be extracted 106 from the web-pages in the same or similar manner as described above in FIGS. 2A-2D and then input into the prediction model function. The resulting prediction may be a probability that a website's users have the determined discrete demographic attribute—e.g., the probability that a website user is a kid (see Table 1).

The prediction model for the determined discrete demographic attribute value may be developed 306 using a regression approach, such as SVR, to estimate a regression model for the determined discrete demographic attribute value, as described above. The regression model may be estimated based on the content representations of the training websites (e.g., THS feature vectors or a subset thereof (e.g., only the T, H, or S vectors, or a combination of two of these vectors)). Likewise, embodiments of the systems and methods of making content-based demographic predictions may build 306 the prediction models using as training instances the training websites or the individual web-pages of the training websites. These two types of models will be referred to as website-level models and web-page-level models, respectively.

Figure 3B:
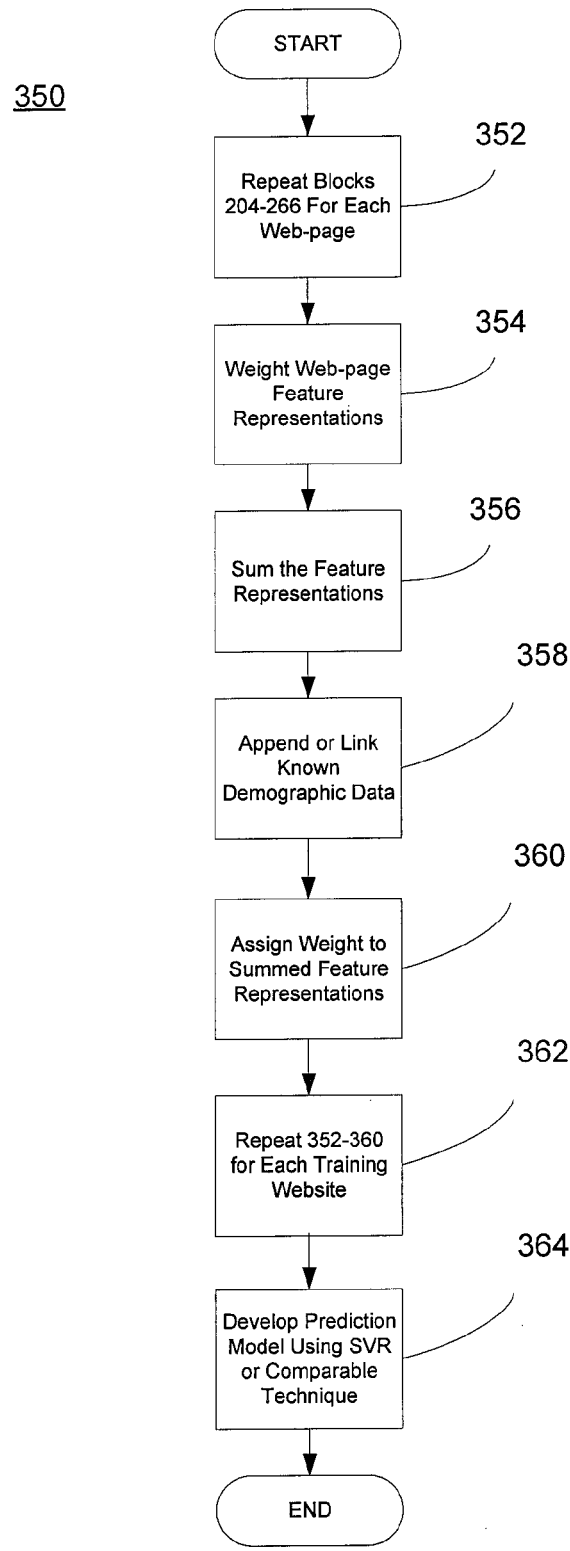

With reference now to FIG. 3B, shown is an embodiment of a method 350 developing website-level prediction models. The developing 306 may perform method 350 to build a website-level prediction model. Combined web-page feature representations determined from training website web-page content may be used to develop website-level prediction models. Likewise, combined web-page feature representations determined from target website web-pages may be input into such models to predict demographic attribute values.

Embodiments that develop 306 website-level prediction models may compute the feature representation for a training website by combining the feature representations gathered, e.g., by embodiments described with reference to FIGS. 2A-2D for the selected subset of the web-pages of that training website. Consequently, as shown, embodiments of method 350 may include repeating the above-described steps (e.g., blocks 202-266) for each web-page (or each web-page of a selected subset of web-pages) of the training website (e.g., or target website) to generate feature representations, e.g., feature vectors THS, or a subset thereof, for each of the web-pages, block 352. Certain web-pages (e.g., a home web-page) of a website may be considered more relevant or more valuable for predicting demographic attributes. Consequently, the feature vectors of web-pages may be weighted based on their determined relevance or value, block 354. Such weighting would affect the summing of the feature vectors for the entire website. Method 350 sums the feature representations, e.g., normalized feature vectors (e.g., THS), of the constituent web-pages (or subset thereof) of the website, block 356. For example, when the THS features are used to represent each web-page, the feature vector for the ith website $S_i$ can be computed by adding the THS feature vectors for a subset of the web-pages of the ith's website. The feature vector $S_i$ for the ith website may be further scaled, for example, by dividing $S_i$ by the number of constituent web-pages in the ith website or by scaling $S_i$ to be unit length. It is noted that embodiments may use, and therefore only sum together, a subset of the features of the web-pages (e.g., only the T, H or S vector, or any combinations of these vectors). Additionally, other feature vectors (or other feature representations) may be generated and summed together to generate the feature vector $S_i$.

For training websites, known demographic attribute(s) data for each website may be appended or otherwise linked to the feature vector $S_i$ for the website, block 358. For example, the attributes data for each training website may be placed in a vector and a matrix or table is generated with all of the attributes data vectors for the training websites, where the ith row (or column) of the table includes the demographic attributes for the ith website in the training set. In yet another embodiment, the prediction model may be only generated for one demographic attribute; accordingly, only the demographic attribute data for the one demographic attribute for which a training model is being developed may be appended or linked 358 to the feature vector for the training website.

It is also noted that certain training websites may be determined or thought to be more or less relevant for the prediction model. For example, a training website may be determined or thought to be more or less relevant because of the size of the training website's audience. In other words, a larger training website audience may make the website's content and demographic attribute data more relevant for the prediction model. Likewise, a training website may be considered more or less relevant to the determination of a specific demographic attribute. Moreover, a training website may be considered more or less relevant based on the number of other training websites or web-pages that link to it. Accordingly, the feature representation (e.g., feature vector $S_i$) of a training website may be assigned a weight based on its relevancy, block 360. The weighting may affect how much the training website feature vector impacts the prediction model and may, therefore, e.g., be input into the regression process.

To complete building the website-level prediction model, the preceding blocks 352 to 360 may be repeated for each training website, block 362. Once the feature vectors $S_i$ for each training website has been generated, the prediction model for the discrete value of the demographic attribute may be developed using SVR with the feature vectors $S_i$, the web graph and the linked 358 demographic attribute data, block 364. As noted above, the prediction model may be developed 364 using the SVMlight implementation of SVR.

Embodiments that develop 306 web-page-level prediction models may use the features extracted from a subset of the web-pages of each training website as the training instances of these web-page level models. During training, the value of the training website's demographic attribute under consideration is used as the value for that attribute for all of its web-pages (i.e., all web-pages are assigned the same value). Accordingly, in these embodiments, the feature vector of each web-page is linked to the row of the table of demographic attributes data of the corresponding website. Then, the prediction model is generated using the feature vector for each web-page and the linked demographic attribute data for that web-page. For example, for the prediction model used to predict the percentage of users that are kids (ages 3-12, Table 1), the value of the target variable for the SVR model for all the web-pages of a certain website will be the percentage of users that are kids for that website. During prediction, the SVR models are used to estimate that values for the different demographic attributes for all the web-pages of a website. These web-page-level predictions are then combined to obtain the prediction at the website level. For example, the percentage of users that are kids may be determined by averaging the corresponding prediction for all the web-pages of a website. Embodiments may also use information about the web-pages from the training website and/or other websites that link to the various web-pages of the target website in determining how the web-page-based predictions may be combined. In these embodiments, predictions of web-pages that are linked to by a larger number of other web-pages will be given a higher weight than other linked web-pages. For example, if $\{p_1, \ldots, p_k\}$ are the predictions for the k web-pages of website and $n_i$ is the number of in-links of the ith page, then the prediction p for the website may be given by $$p = \left(\sum_{i=1}^{k} (n_i + \delta) p_i\right) \bigg/ \left(\sum_{i=1}^{k} (n_i + \delta)\right),$$

where $\delta$ is a constant to account small sample sizes (e.g., it can be set to a small percentage of the number of training websites).

Embodiments of method 300 may implement a cascade learning system or similar learning system (see discussion of cascading classifiers below), to develop and refine the prediction model. Accordingly, in such embodiments, prediction models developed 306 as described above may be referred to as first-level models which may be further refined into second-level prediction models. With reference again to FIG. 3A, method 300 may generate a prediction of the discrete value of the demographic attribute for the websites that are neighbors to the training websites in the web-graph, block 308. A website A is considered to be a neighbor of another website B if there are web-pages in A that link to web-pages in B and vice versa. The prediction may be generated 308 by applying the first-level prediction model developed 306 as described above. For example, feature representations of the training websites' web-graph neighbors may be input into the first-level prediction model, which then generates predictions p for the discrete value of the first-level prediction model.

These predictions p may be used to build a second-level prediction model, block 310. Building 310 the second-level prediction model may be based upon and be similar to approaches used to build cascading classifiers that are used extensively in bioinformatics. See, e.g., George Karypis, YASSPP: *Better Kernels and Coding Schemes Lead to Improvements in Protein Secondary Structure Prediction*, In Journal of Proteins, August 2006, Volume 64-3, pages 575-586, and Huzefa Rangwala and George Karypis, *Building Multiclass Classifiers for Remote Homology Detection and Fold Recognition*, In Journal of BMC Bioinformatics, 2006, vol., 7, page 455, which are hereby incorporated by reference. The second-level model may be built 310 in a similar manner as described above with reference to the developing 306. To build 310 the second-level prediction model, the following inputs, among others, may be used: the various features (e.g., as represented, for example, in feature vectors THS) used to develop the first-level model, the predicted discrete value p of the demographic attribute for each (or a subset) of the web-graph neighbors, and the known discrete demographic attribute value for each (or a subset) of the training websites. In other words, the second-level prediction model may be built from the same input used to develop the first-level model plus the predictions p generated 308 as described above, in affect utilizing a feedback loop to refine the first-level prediction model. Embodiments may repeat this feedback loop to further refine the prediction model. The second-level prediction model, by incorporating predicted demographic attribute value information from the neighboring websites, relies on the principle of homophily as websites that cater to similar audiences will tend to be connected to each other. Embodiments for building this second-level model may use regression-based techniques (e.g., SVR), relational estimation methods (e.g., graphical models, relational Markov networks, Markov random fields, relaxation labeling, iterative estimation), and others.

With continuing reference to FIG. 3A, method 300 may generate a prediction of the discrete value of the demographic attribute for one or more training (or other) websites, e.g., using the developed second-level prediction model, block 312. The prediction may be generated 312 in order to test the prediction model. The generated 312 prediction(s) may be used to build a distribution prediction model (see below). Method 300 may further repeat the above for the remaining discrete values of the determined demographic attribute, block 314, in order to produce prediction models for the remaining discrete values. Note, in embodiments, this is not done for demographic attributes with two discrete values (see description herein for such demographic attributes).

Method 300 produces a prediction model for each discrete value of a demographic attribute with more than two discrete values (e.g., age). When content features of web-pages of a target website (or content features of a target web-page) are input into each prediction model, the prediction model estimates a probability for the discrete value of the demographic attribute. In other words, the prediction model estimates the probability that a target website (or target web-page) visitor has the discrete value for the demographic attribute (e.g., probability that the visitor is a teenager—has an age that fits within the teenager discrete value (see Table 1)).

With continuing reference to FIG. 3A, a potential limitation of certain embodiments described herein is that by estimating the probability for each discrete value of the demographic attribute (variable) independently of the other discrete values, the embodiments may fail to take into account certain correlations that may exist among the different discrete values of the demographic attribute (i.e., between demographic groups of values). For example, if a website has a large fraction of kids (see Table 1), then the website may have a somewhat larger fraction of teenagers (then other websites) as kids and teenagers often share some common interests (at least among the users that are at the boundary of the age breakdown). To address this problem, embodiments of method 300 may build a distribution prediction model that uses as input predictions obtained by the individual prediction models (e.g., the individual SVR prediction models for each discrete attribute value), block 316.

Figure 3C:
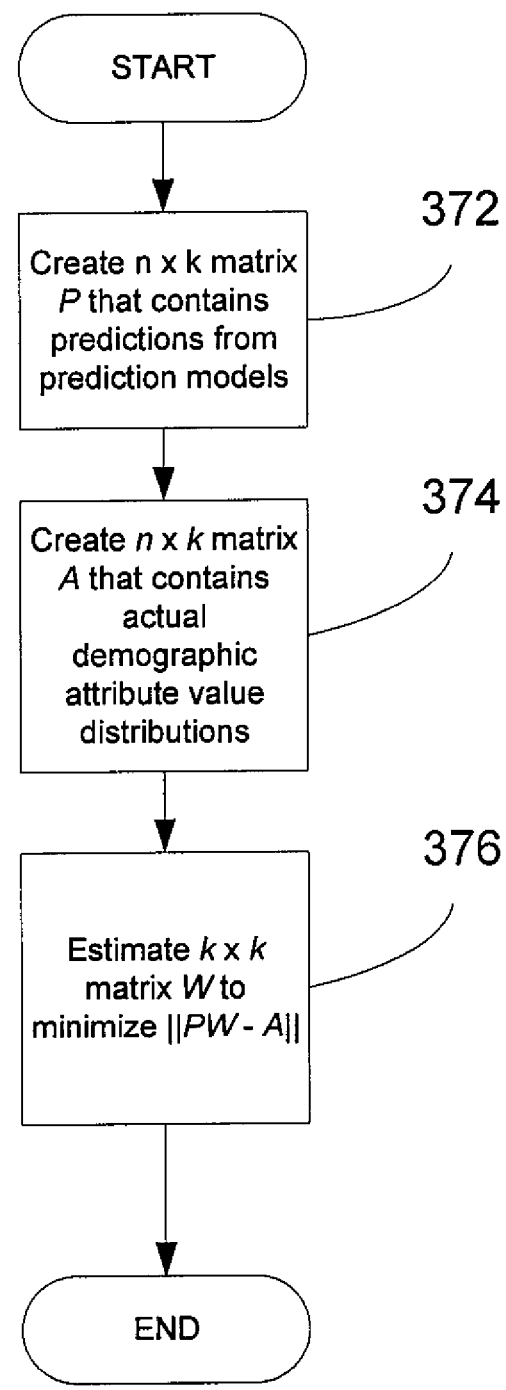

With reference now to FIG. 3C, building 312 a distribution prediction model may include creating a n×k matrix P that will contain website-level predictions p produced by the first-level prediction models, block 372, where n is the number of training websites and k is the number of values of the discrete random variable (i.e., of the demographic attribute) under consideration (e.g., 5 for the age variable). The predictions p used to create the n×k matrix may be generated 308 using training websites. Building 316 may also include creating another n×k matrix A that contains the actual demographic attribute value distributions of the n training websites in the same order as P, block 374. The goal of the distribution prediction model is to estimate a k×k matrix W that minimizes $\|PW-A\|$. Accordingly, building 312, estimates a k×k matrix W that minimizes $\|PW-A\|$, block 376. Matrix W may be estimated, e.g., using the Moore-Penrose method to obtain the pseudo-inverse $P^{-1}$ of the non-square matrix P at which point $W=P^{-1}A$. See Moore, E. H., *On the Reciprocal of the General Algebraic Matrix*, Bulletin of the American Mathematical Society 26: 394395 (1920) and Penrose, Roger, *A Generalized Inverse for Matrices*, Proceedings of the Cambridge Philosophical Society 51: 406-413 (1955), which are hereby incorporated by reference. Matrix W may also be estimated from P by using a cross-validation approach. For example, the training set (set of training websites) may be split into five groups or folds. Each four-fold subset of these five folds may then be used to estimate the prediction model (e.g., the SVR model) and predict the omitted fold. The resulting set of predictions forms matrix P and is, therefore, used to estimate W. See description of FIG. 4 below for a description of the application of the distribution prediction model.

With reference again to FIG. 3A, method 300 may repeat the above for other selected demographic attributes, block 314. Accordingly, method 300 may produce a plurality of prediction models for discrete values of each selected demographic attributes. In embodiments, the prediction models for each discrete value of a demographic attribute can be combined into one prediction model for all discrete values of the demographic attribute.

Once the prediction model (e.g., the first-level prediction model, second-level prediction model and prediction distribution model) is developed and acceptable, embodiments of the systems and methods of making content-based demographic predictions for websites may identify 112 the target website(s) (or web-page(s)) for prediction, obtain 114 the content of the target website(s) (or web-page(s)), and predict 116 the demographic(s) of the target website(s) (or web-page(s)). As noted above, obtaining 114 the content of a target website may be performed in accordance with the method 200 described in FIGS. 2A-2D.

Figure 4:
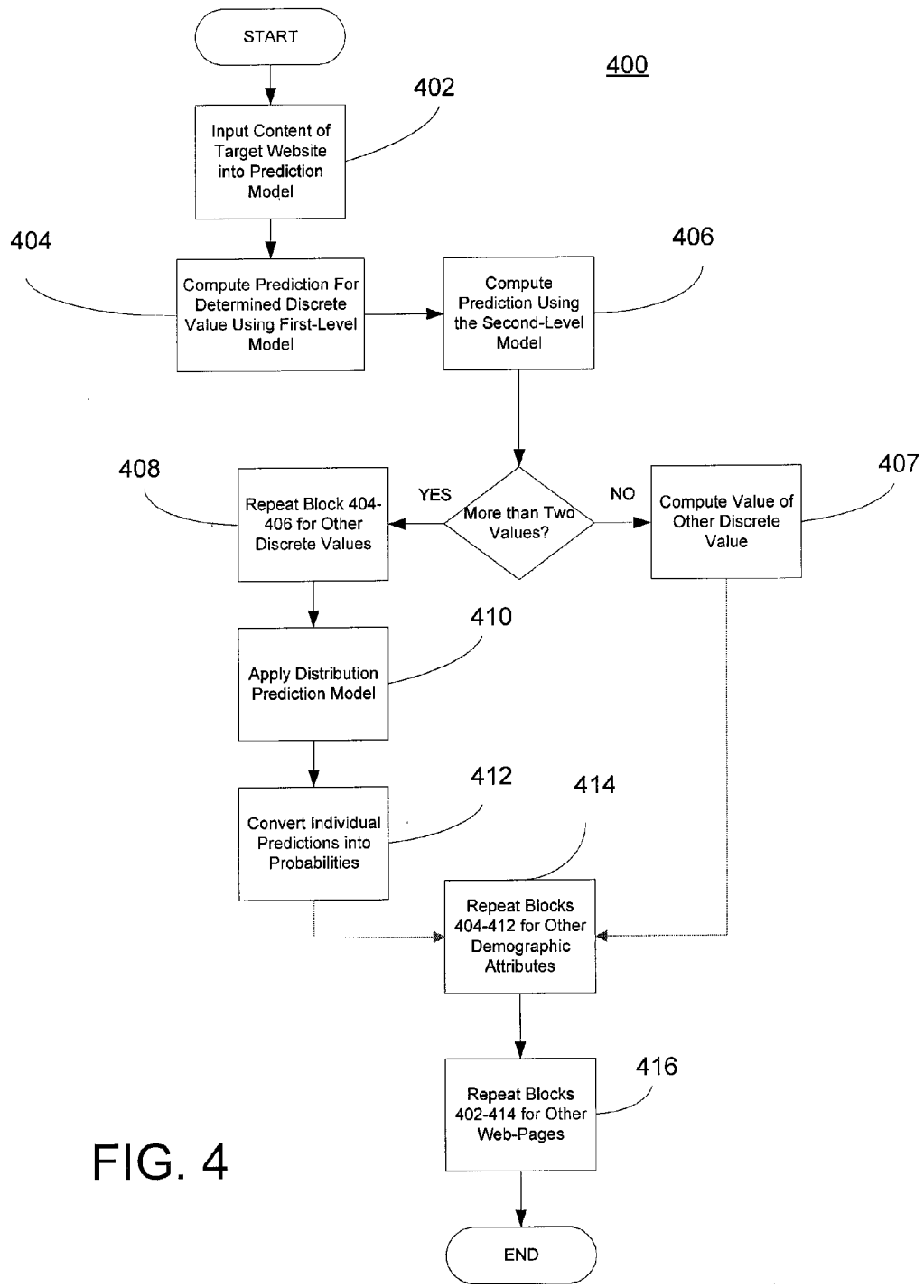
FIG. 4 is a flowchart illustrating an embodiment of a method of applying a prediction model to predict a demographic attribute of a website that may be used in embodiments of systems and methods of making content-based demographic predictions for websites.

With reference now to FIG. 4, shown is an embodiment of a method 400 of applying a prediction model to predict the demographic attribute(s) of an identified website(s) (or web-page(s)). The predicting 116, as seen in FIG. 1, may include performing all or a portion of method 400. Method 400 inputs determined features extracted from web-pages of the identified target website(s) (or of the target web-page(s)) into the prediction model, block 402. These features may be extracted 112 from web-page(s) of the target website (and web-graph neighbors of the target website) in substantially the same manner as described in FIGS. 2A-2E and input, e.g., as feature vectors THS of the target website (or web-page). As noted above, the prediction model may be a function $\hat{f}$ that provides a prediction p of a determined discrete demographic attribute value based on a target website (or target web-page) having certain content (e.g., the target website's web-pages having certain features determined as described above). Accordingly, method 400 executes the first-level prediction model (see FIG. 3A) to compute a prediction p for the determined discrete demographic attribute value, block 404. In embodiments, method 400 applies the first-level prediction model to the target website and web-graph neighbor websites. Accordingly, the feature representations (e.g., feature vectors THS) of target website and neighbor websites are input into the first-level prediction model for the determined discrete demographic attribute value.

Method 400 may apply the second-level prediction model to compute a prediction of the determined discrete demographic attribute value for each target website, block 406. The prediction p of the determined discrete demographic attribute value and the feature representations of the extract features of the target website(s) are input into the second-level prediction model to compute a refined prediction p for the target website(s).

For demographic attributes with two discrete values (e.g., gender=male or female), method 400 may compute the value for the other discrete value, block 407, as described below. For demographic attributes with more than two discrete values (e.g., age=kid, teenager, young adult, adult, old), method 400 may repeat blocks 404-406 using prediction models for each of the other discrete values to output a prediction p for the remaining discrete demographic attribute values, block 408.

With continuing reference to FIG. 4, method 400 may apply the distribution prediction model, block 410. Accordingly, a website is predicted by first using the k prediction models (e.g., the SVR models) to estimate the probability for each discrete value of the discrete random variable (i.e., of the demographic attribute) under consideration (blocks 402-406). The predicting, blocks 402-406, results in a 1×k matrix p. The matrix W is applied to obtain the prediction pW, which is finally converted 412 into a valid distribution, e.g., as described above.

With continuing reference to FIG. 4, the prediction method 300 described above builds a model to estimate the probability for each one of the discrete values of the demographic attribute under consideration. However, these predictions $\{p_i, \ldots p_k\}$ are not guaranteed to form a valid probability distribution (i.e., $\forall i, 0 \leq p_i \leq 1$ and $\Sigma_i p_i = 1$). Embodiments of method 400 may address this problem by using a simple two-step approach to convert the individual predictions into probabilities, block 412. First, any predictions that are negative are set to zero and second, predictions are linearly scaled so that their sum is one.

Note that, in embodiments, the above approach is only used for demographic attributes that take more than two values (i.e., the age demographic attribute). For variables that take only two values (i.e., the gender demographic attribute), the systems and methods described herein may only train a single SVR model that is designed to predict one of those values. If $p_1$ is the prediction obtained by that model, then when $0 \leq p_1 \leq 1$, the value of the other attribute is $p_2 = 1 - p_1$. When $p_i < 0$, $\{p_1, p_2\} = \{0, 1\}$ and when $p_1 > 1$, $\{p_1, p_2\} = \{1, 0\}$. Consequently, computing 406 $p_2$ for the second discrete value may be simply be performed by subtracting the first value prediction, $p_1$, from 1.

In embodiments, method 400 may output a mix of demographic attributes predictions. In other words, method 400 may output predictions for a plurality of different demographic attributes. Consequently, method 400 may repeat blocks 404-412 for additional demographic attributes to output a mix of demographic attribute predictions, block 414. Moreover, the prediction model and the predictions may be achieved at the web-page level, as described above. Accordingly, method 400 may repeat blocks 402-414 for each web-page of the target website, block 416. Method 400 may also include combining the web-page level predictions to produce target website predictions.

Figure 5:
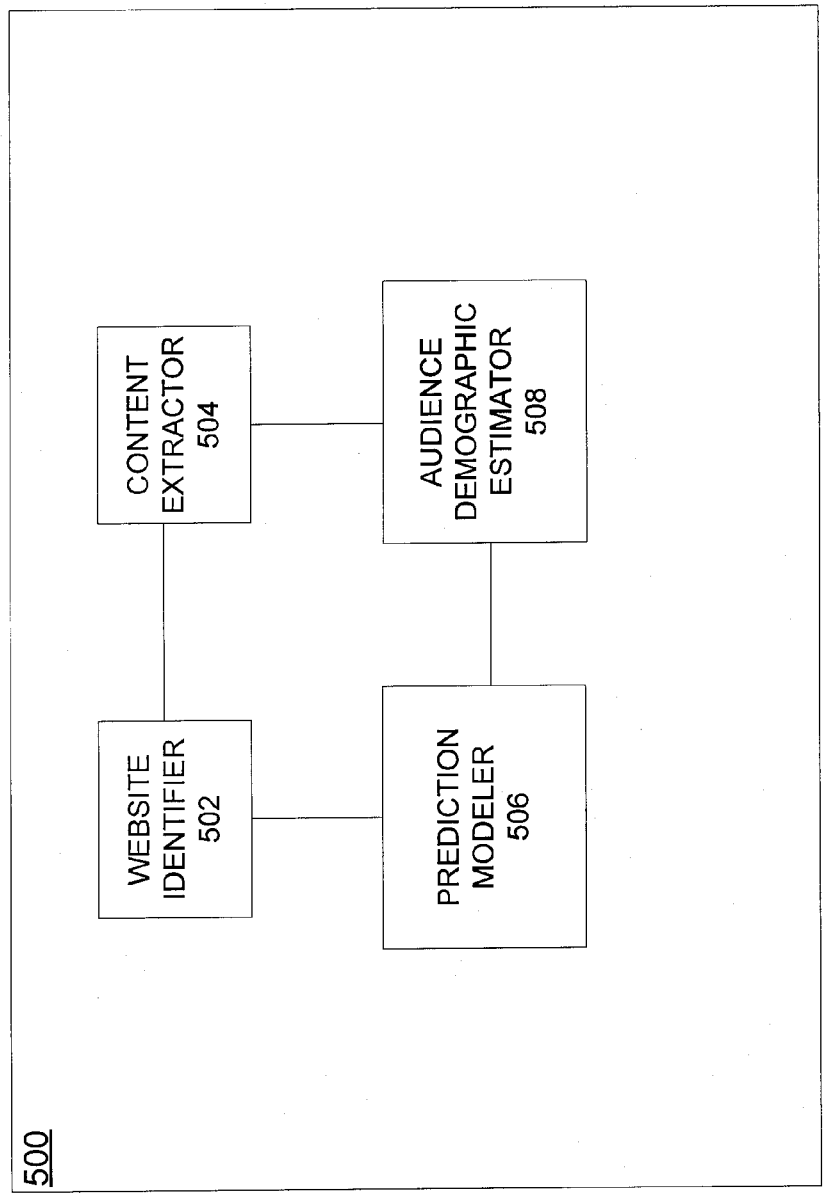
FIG. 5 is a block diagram illustrating an embodiment of a system for making content-based demographic predictions for websites.

With reference now to FIG. 5, shown is a block diagram of an embodiment of a system 500 for making content-based demographic predictions for websites. System 500 components may be implemented as software engines/applications, software modules within one software application, individual general purpose or specific purpose computer systems, or combinations of the above. Such components may be connected via network(s) or otherwise. Multiple system 500 components may be implemented in a combined application, module or computer system. It is apparent to one of skill in the art that system 500 may be implemented in a variety of other manners as well.

System 500 includes website identifier 502, feature extractor 504, prediction modeler 506, and audience demographic estimator 508. Website identifier 502 may identify and select training websites. Website identifier 502 may identify and select training websites as described above with reference to identifying 102 in FIG. 1. Feature extractor 504 may determine/extract content features of training websites and target websites. Accordingly, feature extractor 504 may include a web-page crawler, robot or other tool(s) for determining and extracting content features from websites and web-pages. Feature extractor 504 may also process extracted content features to generate feature representations for use in generating prediction models. For example, feature extractor 504 may process content features and place into sparse term vectors as described above with reference to FIGS. 2A-2E. Feature extractor 504 may also receive and process the demographic attributes data for the training websites from sources of such data, such as commercial providers described above. Feature extractor 504 may process the demographic attributes data to link the data with the training websites' content feature representations as described above.

With continuing reference to FIG. 5, prediction modeler 506 may generate prediction models for demographic attributes. For example, prediction modeler 506 may generate SVR models for discrete demographic attribute values, as described above with reference to FIG. 3. Prediction modeler 506 may generate both first-level, second-level, and distribution prediction models, and other models, as described above. Accordingly, prediction modeler 506 may receive content feature representations from feature extractor 504. Prediction modeler 506 may also receive demographic attributes data from feature extractor 504 or directly from sources of such data. Prediction modeler 504 may retrieve this data from vectors, tables or other locations in which the data has been stored, by feature extractor 504 or otherwise. Audience demographic estimator 508 may generate demographic attribute estimates. Audience demographic estimator 508 may estimate demographic attribute values using prediction models and target website's content representations, as described above with reference to FIG. 4. Accordingly, audience demographic estimator 508 may receive target website content feature representations from feature extractor 504. Audience demographic estimator 508 may output demographic attribute value predictions through any known means, such as via computer display, hard-copy output, electronic file, via network communication, electronic mail; etc.

The following describes an experimental evaluation of embodiments of systems for and methods of making content-based demographic predictions for websites.

Training Website Data Set. The set of training websites were identified as follows. First, the top 2000 websites from Alexa's one million most visited domains was selected, and their demographic information of their visitors as they relate to gender and age was obtained from Quantcast, which is a commercial provider of website demographic data. A subset of 450 websites was selected from that list so that the selected training websites would provide a balanced coverage of the age and gender distribution. For gender, this was done by dividing the male distribution into 10 equal sized buckets and an equal random sample was picked from each bucket. For age, websites were sorted based on each of the age groups and an equal number of top sites were picked from each group. This list of 450 websites was then crawled using the open source Heritrix crawler, and a maximum of 1000 web-pages were fetched from each website in a breadth-first fashion. The set of crawled pages was subsequently pruned to eliminate web-pages with less than 100 words. Furthermore, any websites with fewer than 50 web-pages remaining were also eliminated from the set of training websites. Note that a website can have a small number of web-pages because either the crawler failed to fetch (e.g., pages generated by scripts that the crawler could not handle) or the web-pages fetched contained a small number of words. These steps reduced the total number of websites to 128, which is the set of training websites used in the evaluation.

Evaluation Methodology. For all evaluations, the training website data set was divided into five folds at the website level and a five-fold cross validation was performed. This website level partitioning ensures that the web-pages from a given website are never in both the training and the test sets.

For the distribution prediction approaches based on the pseudo inverse method (see above), matrix W was estimated from P by using a cross-validation approach during training. Specifically, the training set was itself split into five folds and each four-size subset of these folds was used to estimate an SVR prediction model and predict the left-out fold. The resulting set of predictions formed matrix P and was used to estimate W. During the actual prediction, a domain was then predicted using the five different SVR models that were estimated during the within-training five-fold cross-validation, the predictions of the five SVR models were averaged, and then matrix W was used to predict the final distribution. A SVMlight implementation of SVR was used to perform the learning (generation of the prediction model) and prediction. The prediction model generation was performed using a linear kernel function. For the models that were trained on individual web-pages (see above), in order to ensure that each domain contributed equally during training, a mis-prediction weight of $1/n_i$ was assigned to the individual web-pages of the ith domain, where $n_i$ is the number of web-pages of that domain. These weights ensured that the sum of the weights of the training instances for each domain were the same. The width of the regression tube in the SVR (w parameter in SVMlight) was set to 0.025, which was determined after performing a limited set of experiments using different values of w from the set {0.05, 0.025, 0.0125, 0.00625}.

Evaluation Metrics. The evaluation used two different metrics to measure the performance of the predictions computed by the different methods (see below). The first measured the accuracy of the overall predicted discrete distribution, whereas the second measured the accuracy of the individual values of the discrete distribution. The accuracy of the distribution was measured using the root mean squared error (RMSE). The accuracy of the prediction for a specific value of a discrete distribution was measured using absolute error (AE). For all these metrics, the reported results corresponded to the averages over all the websites across the five-fold cross validation.

Baseline Predictions. In order to get a better sense about the quality of the prediction results produced by embodiments described herein, another approach in which the predictions for each variable (each demographic attribute) was computed as the average of the corresponding values in the training set. For example, the percentage of users that belong to the teen group (Table 1) was obtained by computing the average percentage of users that belong to the teen group in the training set. The same 5-fold cross-validation approach used in the evaluation of the prediction models as described above, was used to split the data set into training and test groups in order to obtain the predictions of this averaging model. This is referred to below as the baseline model.

Results. In this section, the results of the experimental evaluation of embodiments for predicting the gender and age distributions of a website's audience are presented.

Performance of Different Features. Table 3 below shows the performance achieved by embodiments described herein for the gender and age prediction tasks for some of the features described above. Specifically, this table shows the average RMSE achieved by the T, TH, and THS features for both the web-page and website level models. Table 3 also shows the average RMSE values obtained by the baseline model described above.

TABLE 3

Average RMSE for Different Types of Features

| | Gender | | Age | |
|---|---|---|---|---|
| Features | web-page | website | web-page | website |
| T | 0.104 | 0.089 | 0.123 | 0.116 |
| TH | 0.111 | 0.093 | 0.122 | 0.118 |
| THS | 0.113 | 0.093 | 0.122 | 0.118 |

The RMSEs of the baseline model was 0.165 and 0.141 for the age and gender prediction problems, respectively.

Overall the actual prediction error (as measured by the average RMSE) is quite low. For the gender prediction problem, the best average RMSE value is 0.089, whereas for the age prediction problem, the best average RMSE value is 0.116. Moreover, these RMSE's are considerably lower that the corresponding values of 0.165 and 0.141 that were obtained by the baseline model. These results suggest that a website's content provide strong information for predicting the demographic attributes of the website and that the overall prediction error between the two tasks is both low and not significantly different. This is in contrast to the results obtained by earlier studies, see Jian Hu, Hua-Jun Zeng, Hua Li, Cheng Niu, Zheng Chen, *Demographic Prediction Based on User's Browsing Behavior*, Proceedings of the 16th international conference on World Wide Web, May 8-12, 2007, Banff, Alberta, Canada, in which it was observed that predicting the age distribution of a web-page's visitors is considerably harder than predicting the gender distribution.

TABLE 4

Age Tendency Prediction Results at Web-Page Level

| | Average Absolute Error | | | | |
|---|---|---|---|---|---|
| Features | Kid | Teen | Young Adult | Adult | Old |
| T | 0.027 | 0.108 | 0.138 | 0.096 | 0.129 |
| TH | 0.027 | 0.108 | 0.135 | 0.096 | 0.130 |
| THS | 0.027 | 0.110 | 0.134 | 0.096 | 0.129 |

TABLE 5

Age Tendency Prediction Results at Website Level

| | Average Absolute Error | | | | |
|---|---|---|---|---|---|
| Features | Kid | Teen | Young Adult | Adult | Old |
| T | 0.033 | 0.105 | 0.127 | 0.098 | 0.112 |
| TH | 0.031 | 0.112 | 0.127 | 0.099 | 0.113 |
| THS | 0.031 | 0.112 | 0.127 | 0.099 | 0.113 |

Tables 4 and 5 further analyzes the prediction results obtained by the different features for the age prediction task by showing the average AE for each of the five age groups in our dataset. These results were obtained by using the models trained and applied at the page level. These results show that errors achieved for each of the age groups does vary across the age groups, with the "Young Adults" achieving the worse AE of 0.138 and the "Kid" group achieving the lowest of 0.027. However, even in the case of the worst performing age group, the actual AE is relatively low.

Performance of Model Granularity. Table 6 below compares the performance of the two different levels of granularity described above (website and web-page) at which the models may be learned or applied in embodiments described herein. Specifically, this table shows the average RMSEs that were obtained by the methods that predict at either the web-page or website levels using models that were trained using either of these two levels.

TABLE 6

Average RMSEs for Training and Predicting at Different Levels of Granularity

| | Prediction Granularity | | | |
|---|---|---|---|---|
| Learning | Gender | | Age | |
| Granularity | Web Page | Web Site | Web Page | Web Site |
| Page | 0.104 | 0.165 | 0.123 | 0.140 |
| Web Site | 0.157 | 0.089 | 0.143 | 0.116 |

These results show that for a given prediction granularity level, the best result is achieved by using the model that was trained on the same level of granularity. That is, web-page level predictions perform best for models trained on web-pages, where as website level predictions perform best for models trained on websites. These results indicate that the two models are intrinsically different, and that the best prediction performance is achieved when the test/target data has the same characteristics as the data used for training.

Comparing the relative performance of the website and web-page level models, it may be seen that for both prediction tasks, the models trained and applied at the website level achieve better results than those achieved by the corresponding web-page models. Moreover, for both prediction tasks, the relative performance advantage of the website level models is quite substantial. These results suggest that by representing the web-pages of an entire website into a single training instance better captures the website's overall characteristics, leading to better models and more accurate predictions. Moreover, the additional advantage of this approach over the web-page level models is that they are computational less expensive for both model learning and prediction.

Determining Anomaly Websites

As described above with reference to FIGS. 1 and 5, embodiments of the systems and methods identify training websites. Embodiments may be configured to further identify anomaly websites and remove them from the set of training websites. For example, an embodiment of the system and method may seek to identify anomaly websites by extracting the content features of a training website and inputting the features into a previously generated prediction model for a demographic attribute value or a set of prediction models for a plurality of demographic attribute values. The system and method then predicts the demographic attribute value(s) for the training website and compares the predicted demographic attribute value(s) to the actual demographic attribute value(s) for the training website. If the predicted attribute value(s) is sufficiently different (e.g., >20%) from the actual demographic attribute value(s), the training website may be an anomaly website that is so different from the norm, that it should be removed from the set of training websites. The system and method may repeat this process for a number of demographic attributes. If substantial number of the predicted attribute value(s) for the other demographic attributes are substantially different from the actual values, the training website may be defined as an anomaly website and removed from the training set. This process may be repeated until all of anomaly websites have been identified and removed. Then, the prediction model may be re-generated. The difference between the mix of actual and predicted demographic attributes values may be computed in a number of ways, which include, but are not limited, to Euclidean distance, cosine similarity, Kullback-Leibler divergence, etc.

Predicting Characteristics of a User

Figure 6:
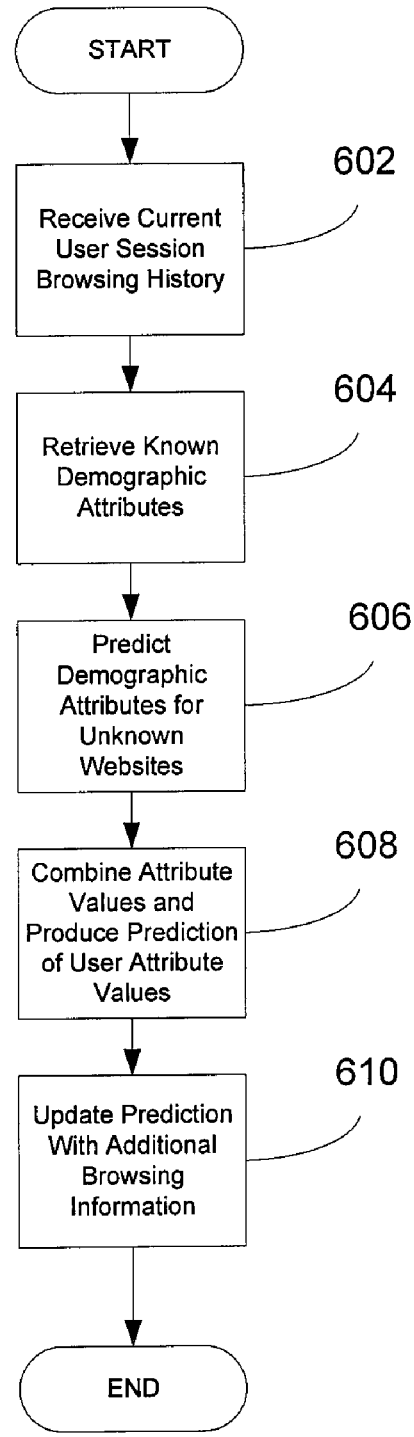
FIG. 6 is a flowchart of an embodiment of a method of predicting characteristics of a user, utilizing embodiments of the systems for and methods of making content-based demographic predictions for websites.

With reference to FIG. 6, shown is an embodiment of a method 600 of predicting characteristics of a user. Method 600 utilizes the systems and methods described herein to predict the demographic attributes of a specific, individual user. Method 600 may receive or obtain as input the current session browsing history of the user, block 602. It is noted that the user's browsing history is only used to identify the websites or web-pages visited by a user so that the user's demographic attributes may be predicted. The browsing history is not used to generate prediction models or make predictions. For a user that is currently visiting a website, embodiments use the browsing information of the user and the websites visited by the user to predict the demographic attributes values of that user. If the websites include known websites, method 600 may retrieve the known demographic attributes data for those websites, block 604. If the websites include unknown websites, systems and method may predict the demographic attributes values for those unknown websites as described above, block 606. Using the retrieved and/or predicted website demographic attributes values, method 600 may combine these values and use statistical methods to predict the distribution of the demographic attributes for that specific user, block 608. For example, focusing on the gender demographic attribute, if the user has visited k websites $\{w_1, w_2, w_k\}$, such that $(p_i^m, p_i^f)$ is the probability distribution for the ith website as it relates to its male and female visitors, then the gender probability distribution for that user is $$\left( \frac{\prod_{i=1}^{k} p_i^m}{\prod_{i=1}^{k} p_i^m + \prod_{i=1}^{k} p_i^f}, \frac{\prod_{i=1}^{k} p_i^f}{\prod_{i=1}^{k} p_i^m + \prod_{i=1}^{k} p_i^f} \right).$$

A similar approach is used to compute the distribution of other demographic attributes. As the user continues to browse websites, the prediction may be updated, block 610.

Determining Combination of Websites and Web-Pages to Reach a Target Demographic Mix Embodiments of the systems and methods described herein may be used to determine a combination of websites (and/or web-pages) and the number of impressions of advertisements that should be used for an advertisement campaign in order to reach a set of users/visitors that have a target demographic mix. A target demographic mix is a set of users/visitors with desired demographic attribute values. For example, a target demographic segment, T1, may be a set of users/visitors that are male, young adult and earning in excess of $150,000 a year. Another target demographic segment, T2, may be a set of users/visitors that are female, adult and with kids. A target demographic mix is the percentage distribution of target demographic segments in an advertisement campaign. For example, a target demographic mix for one advertisement campaign, that wants to reach 100,000 users/visitors, has 70% of users (70,000) belonging to T1, and 30% of users (30,000) belonging to T2. Embodiments of the systems and methods determine a set of websites and associated number of impressions of advertisements for each website, such that 70,000 users/visitors belonging to T1 see the advertisement and 30,000 users/visitors belonging to T2 see the advertisement.

Figure 7:
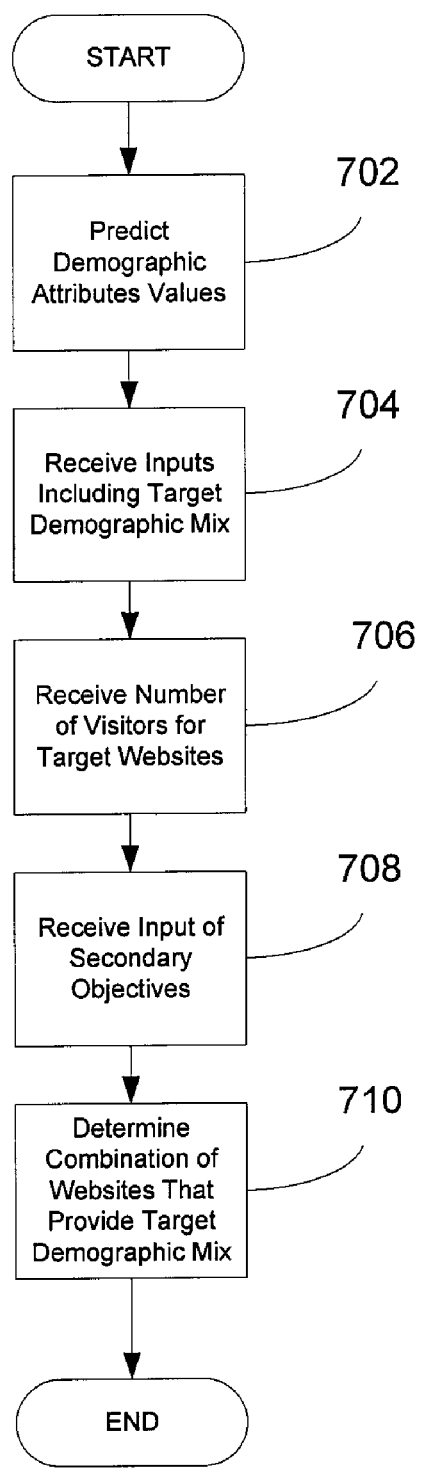
FIG. 7 is a flowchart of an embodiment of a method of determining a combination of websites to reach users that have a desired or target mix of demographic attribute values, utilizing embodiments of the systems for and methods of making content-based demographic predictions for websites.

With reference now to FIG. 7, shown is an embodiment of a method 700 of determining a combination of websites (and/or web-pages) and the number of impressions of advertisements to obtain a target demographic mix. The method 700 is described with reference to websites; it is understood that method 700 may be used to identify individual web-pages instead or in addition to websites. In an embodiment, method 700 may predict a mix of demographic attributes values for a set of ad-carrying target websites, block 702. The prediction 702 may be performed as described above with reference to FIGS. 1-5. Inputs including, without limitation, the predicted demographic attributes values for each of the target websites, a listing of the target websites, the cost of advertising in the target websites, the available advertising space in the target websites, and the target demographic mix may be received, block 704. The desired demographic attributes may include any demographic attributes that have been predicted, including without limitation, age distribution, gender, and income distribution. The method 700 may also consider training or other websites with known demographic attributes. Accordingly, received 704 inputs may also include a listing of training and known websites, demographic attributes, cost of advertising and the available advertising space for the training and known websites.

Method 700 may receive or otherwise obtain the number of visitors for the ad-carrying target websites, block 706. Likewise, the method 700 may receive a selection or input of secondary objectives, block 708. The method 700 may then determine a combination of websites (or web-pages) that provide the target demographic mix, block 710. The determining 710 may process, e.g., using an optimization method, the predicted demographic attributes of the ad-carrying target websites, the received inputs, and the number of visitors for the ad-carrying target websites to determine the combination of websites (or web-pages) that provide the target demographic mix.

In embodiments, method 700 may determine 710 the combination of websites (or web-pages) that provide the target demographic mix while also meeting or minimizing the secondary objectives. Accordingly, method 700 may utilize or include an optimization method to determine 710 the combination of websites that can be used to achieve the desired demographic attributes values mix while minimizing or meeting one or more secondary objectives. The secondary objectives may include without limitation the total advertising cost, the total time that is required to reach the audience with the target demographic mix, the number of ads that may be placed, etc. The optimization method may be implemented in a number of ways and can include, but is not limited to, discrete optimization, continuous optimization, exact methods, and heuristics methods such as simulated annealing or genetic algorithms. The determining 710 may produce an optimized list of websites on which an advertiser may place ads for an ad campaign. Method 700 may monitor the results of such an ad campaign, receiving and tracking inputs including the number of visits and any relevant information about the characteristics of the ad campaign audience, and may dynamically re-optimize an initial solution to ensure that the initial constraints are still satisfied while still minimizing or best meeting the secondary set of objectives.

Accordingly, based on the demographic attribute values predicted according to embodiments described herein, specific websites and web-pages can be recommended for an ad campaign to achieve the target demographic mix. Notably, these predictions are made based upon the analysis of the content of the websites, and without the use of data representing specific potential customers, offering a true "user data free" method of targeted ad placement. As such, the prediction for and recommendation of target websites is based purely on content of web-pages, via estimated or gathered audience characteristics (in a group level, but not in a specific user level) of similar, known websites.

Keywords to Buy for a Target Demographic Mix

Figure 8:
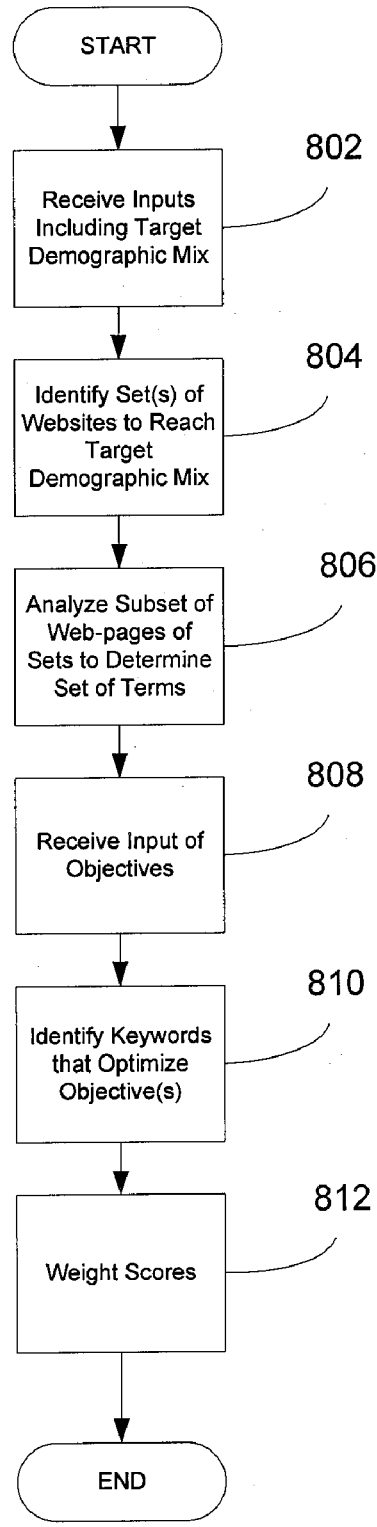
FIG. 8 is a flowchart of an embodiment of a method of identifying keywords to buy to obtain a target demographic mix, utilizing embodiments of the systems for and methods of making content-based demographic predictions for websites.

Systems and methods described herein may also be used to determine a set of keywords to bid on in order for a keyword-based online advertising campaign (e.g., similar to the AdSense keyword-based advertising bid and placement provided by Google) to reach a set of website visitors that have a desired target demographic mix, as defined above. With reference now to FIG. 8, shown is an embodiment of method 800 of identifying keywords to buy to obtain a target demographic mix. Embodiments of these methods may receive as input a desired target demographic mix, block 802. Embodiments may then identify one or more sets of website combinations to reach the target demographic mix, as described above (see, e.g., FIG. 7), block 804. Embodiments of method 800 analyze a subset of the web-pages of the identified websites and determine the set of terms that occur in the web-pages, block 806. Certain objectives may be received, block 808. Embodiments may utilize feature selection methods and optimization methods to identify a set of terms that appear in the web-pages of these website combinations, referred to as keywords, which simultaneously optimize certain objectives, block 810. Those objectives may include at least one of the following: (i) the relative occurrence frequency of these keywords in the web-pages of the identified website combinations being much higher than their relative occurrence frequency in all the websites, (ii) the sets of keywords being selected from the different websites in the same proportions that are identified by the identified website combination required to reach the target demographic attribute value mix, and (iii) the sets of keywords corresponding to the least costly keywords. The optimization method may be implemented in a number of ways and may include, but is not limited to, discrete optimization, continuous optimization, exact methods, and heuristics methods such as simulated annealing or genetic algorithms. The feature selection methods might include methods in which each keyword is assigned multiple scores with respect to the above objectives, and the sum of these scores is used to rank and select keywords. Embodiments of these methods may assign different weights to these scores so as to give higher importance to the various optimization objectives, block 812. These keywords can then be bid on in order to reach the identified website combinations, and consequently the audience that has the desired target demographic mix.

Figure 9:
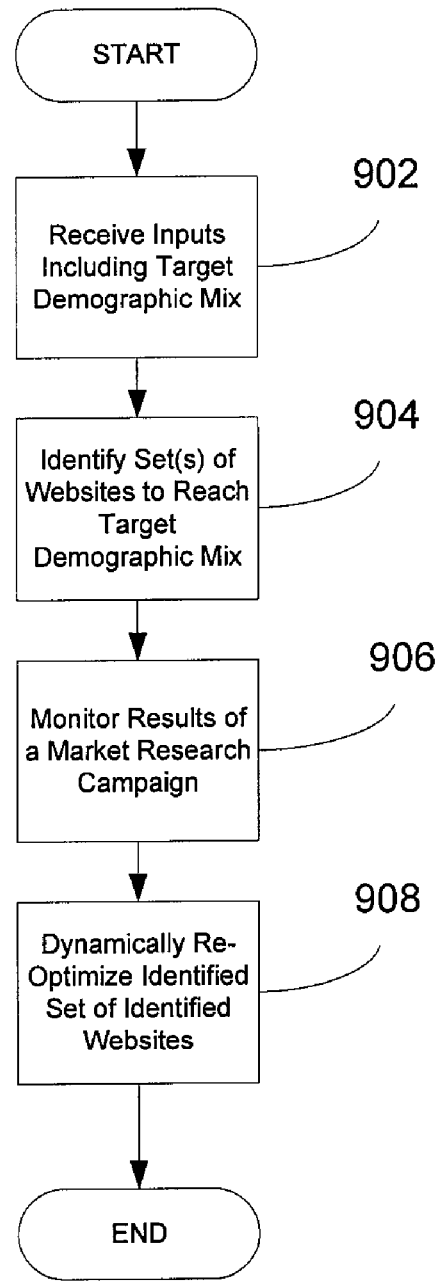
FIG. 9 is a flowchart of an embodiment of a method of selecting websites for market research, utilizing embodiments of the systems for and methods of making content-based demographic predictions for websites.

Selection of Websites for Market Research whose Visitors have a Target Demographic Mix Systems and methods described herein may also be used to select a set of websites whose audience subsets will be targeted for market research purposes. With reference now to FIG. 9, shown is an embodiment of method 900 of selecting websites for market research. Embodiments of these methods may receive as input a desired target demographic mix, block 902. Embodiments may then identify multiple sets of website combinations to reach the target demographic mix, using a method similar to that described above (e.g., see FIG. 7), block 904. Embodiments of these methods may utilize additional objectives in the optimization procedure for identifying and selecting among the multiple sets of website combinations that reach the target demographic mix such as total cost of acquiring the users to be enlisted in the market research, the total time that is required to enroll the required number of users, etc. The market research can be performed on the identified websites in a number of ways, including without limitation placing ads asking people to participate in a market research study, pop-ups asking people to complete short surveys, etc. Embodiments may monitor the results of a market research campaign, block 906, by taking into account the number of visits and any relevant information about the demographic attributes of the visitors, and dynamically re-optimize the initial solution to ensure that the initial constraints are still satisfied while still minimizing the initial set of objectives, block 908. As part of the dynamic re-optimization, embodiments of these methods may identify a new set of website combinations that are better suited for identifying visitors that have the target demographic mix of the yet to be enrolled people in the market research.

Planning Tool for Ad Networks

Systems and methods described herein may also be used to determine the websites with which ad networks should establish ad placement relations in order to achieve an audience with a desired target demographic mix for a forecasted demand. Embodiments of these methods may take as input the desired target demographic mix of the forecasted demand. Embodiments may then identify multiple sets of website combinations to reach the target demographic mix, using a method similar to that described above (e.g., see FIG. 7). Embodiments of these methods may utilize additional objectives in the optimization procedure for identifying and selecting among the multiple sets of website combinations that reach the target demographic mix such as total advertising cost, the total time that is required to reach the forecasted target audience, prior partnership information, competitor information, etc. These sets of websites may then be used by the ad networks as the potential new partners that need to be brought into their networks in order to meet the forecasted demand.

Website Design Tool for Designing Websites That Appeal To an Audience with Desired Demographic Characteristics Systems and methods described herein may also be used to determine how a website should be designed or re-designed or what new websites should be designed in order to appeal to an audience with a desired set of demographic characteristics.

Figure 10:
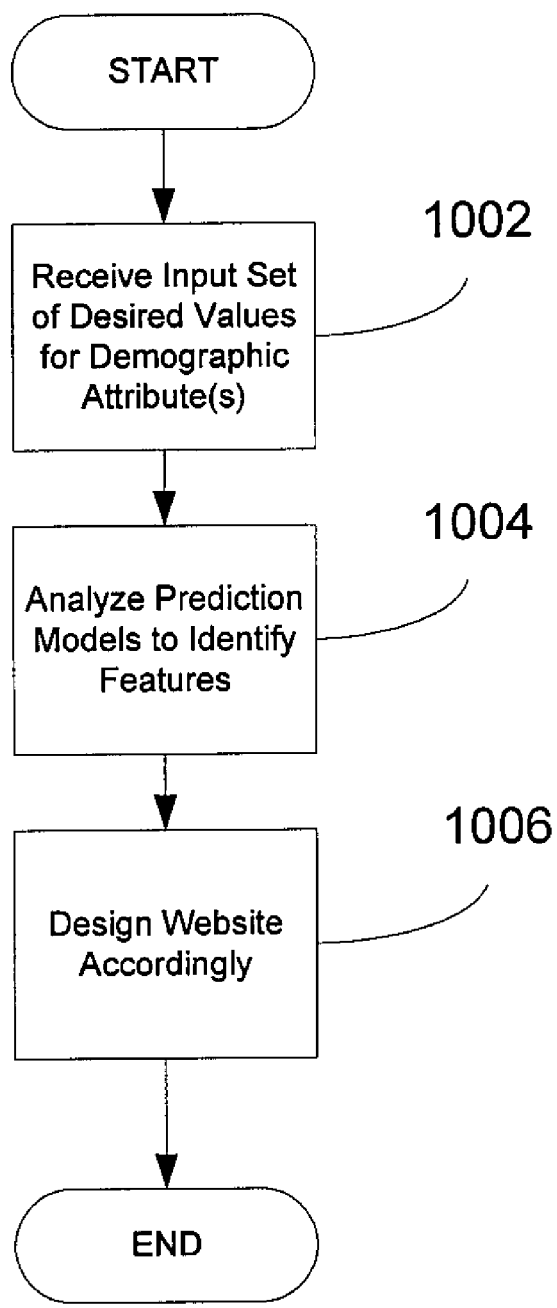
FIG. 10 is a flowchart of an embodiment of a method of designing websites to appeal to an audience with desired demographic characteristics, utilizing embodiments of the systems for and methods of making content-based demographic predictions for websites.

With reference now to FIG. 10, shown is an embodiment of method 1000 of designing websites to appeal to an audience with desired demographic characteristics. Embodiments of these methods may receive as input a set of desired values for one or more demographic attributes that will define the demographic characteristics of the website's audience, block 1002 Embodiments may analyze the prediction models developed as described above to determine correlation between different features describing the intrinsic properties of a website (e.g., textual content, structural content, linkings, etc.) and the set of training websites whose visitors have the desired demographic characteristics, block 1004. The analysis 1004 may identify combinations of features that if present in a website, would be predicted to result in an audience having the desired demographic characteristics. The method used to perform the analysis and identification 1004 of the desired feature combinations may depend on the specific statistical or machine learning method that was used to build the estimation models (see, e.g., FIG. 3) for the demographic attribute values used in the method described above. Embodiments of the methods above that build the prediction model using SVR with linear kernel functions may identify the feature combination directly from the estimated linear model by utilizing the dimensions of the model (that correspond to the various textual, structural, and other features used to describe the web-pages or websites) and by considering the dimensions that have the highest positive coefficients. These dimensions correspond to the features that, if present in a website, will lead to the website being estimated as having the desired value for the demographic attribute under consideration. Combinations of these attribute-value specific features over all the attribute-values defining the demographic characteristics of the desired audience may then be used to define the overall set of features that need to be present in a website in order to be estimated as having the desired demographic attributes. A website may then be designed or re-designed to incorporate such content features, block 1006.

Hardware Implementation

As stated above, the methods described above may each be implemented as one or more computerized systems. The systems and methods may be implemented as computer applications, engines, computer application modules, specific purpose computers, software running on general purpose computers, and various combinations of these and other known manners of implementing computerized methods. Likewise, the methods may be fully or partially computer implemented.

With reference now to FIG. 11, illustrated is an embodiment of a computerized system for implementing embodiments of the systems for and methods of making content-based demographic predictions for websites. Computer system 1100 may be any type of computer, including without limitation a server or plurality of servers. Computer system 1100 typically includes a memory 1102, a secondary storage device 1104, a processor 1106, an input device 1108, a display device 1110, and an output device 1112. Memory 1102 may include RAM or similar types of memory, and it may store one or more applications (e.g., including applications programmed to execute embodiments of methods described herein or embodying systems described herein.) for execution by processor 1106. Secondary storage device 1104 may include a hard disk drive, floppy disk drive, CD-ROM drive, or other types of non-volatile data storage. Processor 1106 executes the application(s), which is stored in memory 1102 or secondary storage 1104, or received from the Internet or other network 1116.

Input device 1108 may include any device for entering information into computer system 1100, such as a keyboard, mouse, cursor-control device, touch-screen, microphone, digital camera, video recorder or camcorder. Display device 1110 may include any type of device for presenting visual information such as, for example, a computer monitor or flat-screen display. Output device 1112 may include any type of device for presenting a hard copy of information, such as a printer, and other types of output devices include speakers or any device for providing information in audio form.

Computer system 1100 may store a database structure in secondary storage 1104, for example, for storing and maintaining information need or used by the application(s). Also, processor 1106 may execute one or more software applications in order to provide the functions described in this specification, specifically in the methods described above, and the processing may be implemented in software, such as software modules, for execution by computers or other machines. The processing may provide and support web-pages and other GUIs. The GUIs may be used to enter inputs or view outputs of the systems and methods described herein. The GUIs may be formatted, for example, as web-pages in HyperText Markup Language (HTML), Extensible Markup Language (XML) or in any other suitable form for presentation on a display device.

With continuing reference to FIG. 9, the computing system 1100 may also include a network adaptor or other connection 1114 for connecting computing system 1100 to the Internet or other network(s) 1116. Through network connection 1114 computing system 1100 may connect to the Internet in order to access training and target websites, for example, and in order to perform the methods described herein.

Although computer system 1100 is depicted with various components, one skilled in the art will appreciate that the servers can contain additional or different components. In addition, although aspects of an implementation consistent with the above are described as being stored in memory, one skilled in the art will appreciate that these aspects can also be stored on or read from other types of computer program products or computer-readable media, such as secondary storage devices, including hard disks, floppy disks, or CD-ROM; or other forms of RAM or ROM. The computer-readable media may include instructions for controlling a computer system 1100 to perform a particular method, such as the methods described herein.

The terms and descriptions used herein are set forth by way of illustration only and are not meant as limitations. Those skilled in the art will recognize that many variations are possible within the spirit and scope of the invention as defined in the following claims, and their equivalents, in which all terms are to be understood in their broadest possible sense unless otherwise indicated.

The invention claimed is:

1. A method of making demographic predictions for websites the method comprising:
    selecting one or more websites with known demographic attributes for use as training websites;
    obtaining demographic attributes data of the training websites;
    determining first features of web-pages of the training websites;
    developing a prediction model using the determined first features and the obtained demographic attributes data, wherein the prediction model predicts one or more values for a target demographic attribute;
    determining second features of web-pages of a target website; and applying the prediction model to the determined second features of the target website to predict one or more values for the target demographic attribute of the target website.

2. The method of claim 1 wherein the developing a prediction model develops the prediction model using support vector regression techniques.

3. The method of claim 1 wherein the determining the first features of web-pages of the training websites includes:
extracting the first features from content of web-pages of the training websites; and
storing representations of the extracted first features in term vectors.

4. The method of claim 3 further comprising:
concatenating the term vectors for each of a subset of web-pages of each of the training websites;
weighting the concatenated term vectors for each of the training websites, wherein developing a prediction model develops the prediction model based on the weighted, concatenated term vectors of each of the training websites.

5. The method of claim 1 wherein the determining the first features of web-pages of the training websites includes determining the linking features of the training websites.

6. The method of claim 1 wherein the determining the first features of web-pages of the training websites includes determining the textual and structural features of web-pages of the training websites.

7. The method of claim 1 wherein the determining the first features of web-pages of the training websites includes determining HTML tag terms of web-pages of the training websites.

8. The method of claim 1 wherein the determining the first features of web-pages of the training websites determines first features from a subset of the web-pages of the training websites.

9. The method of claim 1 wherein developing a prediction model includes developing a prediction model for each of a plurality of discrete values for the target demographic attribute.

10. The method of claim 9 wherein applying the prediction model to the determined second features of the target website includes applying the prediction model for each of the plurality of discrete values of the second demographic attribute to predict discrete values of the target demographic attribute.

11. The method of claim 1 wherein developing a prediction model includes developing a second level prediction model using a cascading learning process.

12. The method of claim 1 wherein developing a prediction model includes developing a distribution prediction model.

13. A method of making demographic predictions for websites, the method comprising:
developing a prediction model using extracted first features and demographic attributes data of a set of training websites, wherein the prediction model predicts one or more values for a target demographic attribute;
determining second features of web-pages of a target website; and
applying the prediction model to the determined second features of the target website to predict one or more values for the target demographic attribute of the target website.

14. The method of claim 13 wherein the determining the second features of web-pages of the target website includes:
extracting the second features from content of web-pages of the training website; and
storing representations of the extracted second features in term vectors.

15. The method of claim 14 further comprising concatenating the term vectors for each of a subset of web-pages of the target website, wherein the applying applies the prediction model to the concatenated term vectors.

16. The method of claim 13 wherein the determining the second features of web-pages of the target website includes determining the linking features of the target website.

17. The method of claim 13 wherein the determining the second features of web-pages of the target website includes determining the textual and structural features of web-pages of the target website.

18. The method of claim 13 wherein the determining the second features of web-pages of the target website includes determining tag terms of web-pages of the target website.

19. The method of claim 14 wherein the determining the second features of web-pages of the target website determines second features from a subset of the web-pages of the target website.

20. The method of claim 13 wherein applying the prediction model to the determined second features of the target website to predict the target demographic attribute of the target website includes applying a prediction model for each of a plurality of discrete values of the target demographic attribute to predict discrete values of the target demographic attribute.

21. A method of making demographic predictions for websites comprising:
identifying one or more websites with known demographic characteristics as training websites; and
comparing a first set of features of the training websites to a second set of features of one or more target websites; wherein the comparing includes:
storing representations of the first set of features in term vectors;
concatenating the term vectors for each of a subset of web-pages of each of the training websites;
weighting the concatenated term vectors for each of the training websites.

22. The method of 21 further defined as correlating the first set of features of the training websites to the known demographic characteristics of the training websites.

23. The method of 22 further defined as developing a prediction model based upon a correlation of the first set of features of the training websites and the known demographic characteristics of the training websites.

24. The method of 23 further defined as applying the prediction model to the one or more target websites.

25. The method of claim 22 wherein the correlating comprises developing a regression prediction model.

26. A method of making demographic predictions for websites comprising:
obtaining demographic attributes data of a set of training websites;
determining first features of web-pages the set of training websites;
correlating the determined first features of web-pages of the set of training websites and the obtained demographic attributes data of the set of training websites;
determining second features of web-pages of a target website; and
predicting values of a second demographic attribute of the target website based on the correlating.

27. The method of claim 26 wherein determining the first features of web-pages of the set of training websites includes:
- extracting the first features from content of web-pages of the training websites; and
- storing representations of the extracted first features in term vectors.

28. The method of claim 27 wherein the correlating includes using support vector regression techniques.

29. The method of claim 28 wherein the correlating uses support vector regression techniques to generate a prediction model that is used in the predicting.

30. A non-transitory computer readable medium comprising instructions stored thereon that may be executed by a computer for making demographic predictions for websites without using user information for the websites by:
- developing a prediction model using extracted first features and demographic attributes data of a set of training websites, wherein the prediction model predicts one or more values for a target demographic attribute;
- determining second features of web-pages of a target website; and
- applying the prediction model to the determined second features of the target web site to predict one or more values for the target demographic attribute of the target web site.

31. The computer readable medium of claim 30 further including instructions to develop the prediction model using support vector regression techniques.

32. The non-transitory computer readable medium of claim 30 further including instructions to determine the first features of web-pages of the training websites by:
- extracting the first features from content of web-pages of the training websites; and
- storing representations of the extracted first features in term vectors.

33. The non-transitory computer readable medium of claim 32 further including instructions for:
- concatenating the term vectors for each of a subset of web-pages of each of the training websites;
- weighting the concatenated term vectors for each of the training websites, wherein developing a prediction model develops the prediction model based on the weighted, concatenated term vectors of each of the training websites.

34. The non-transitory computer readable medium of claim 32 further including instructions to determine first features from a subset of the web-pages of the training websites.

35. The non-transitory computer readable medium of claim 32 further including instructions for developing a prediction model for each of a plurality of discrete values for the target demographic attribute.

36. The non-transitory computer readable medium of claim 32 further including instructions for applying the prediction model to the determined second features of the target website to predict a second demographic attribute of the target website by applying the prediction model for each of the plurality of discrete values of the second demographic attribute to predict discrete values of the second demographic attribute.

37. A system for making demographic predictions for websites, comprising:
- a processor;
- a memory, wherein the memory includes instructions stored thereon that are executed by the processor for making content-based demographic predictions for websites without using user information for the websites by:
  - developing a prediction model using extracted first features and demographic attributes data of a set of training websites, wherein the prediction model predicts one or more values for a target demographic attribute;
  - determining second features of web-pages of the target website; and
  - applying, utilizing the processor, the prediction model to the determined second features of the target website to predict the target demographic attribute of the target website; and
- a network connection for connecting to a network and accessing training and target websites.

38. The method of claim 1 wherein the obtaining demographic attributes data does not obtain browsing behavior or browsing history data of any visitor of the training websites.

39. The method of claim 13 wherein the demographic attributes data of a set of training websites does not include any browsing behavior or browsing history data of any visitor of the training websites.

40. The method of claim 26 wherein the obtaining demographic attributes data does not obtain browsing behavior or browsing history data of any visitor of the training websites.

41. The non-transitory computer readable medium of claim 30 wherein the demographic attributes data of a set of training websites does not include any browsing behavior or browsing history data of any visitor of the training websites.

42. The system of claim 37 wherein the demographic attributes data of a set of training websites does not include any browsing behavior or browsing history data of any visitor of the training websites.

* * * * *

UNITED STATES PATENT AND TRADEMARK OFFICE
CERTIFICATE OF CORRECTION

PATENT NO. : 8,412,648 B2  
APPLICATION NO. : 12/643916  
DATED : April 2, 2013  
INVENTOR(S) : George Karypis et al.

Page 1 of 1

It is certified that error appears in the above-identified patent and that said Letters Patent is hereby corrected as shown below:

In the Claims:

In col. 28, line 55, after "sites" insert --,--.

In col. 29, line 16, after "websites;" insert --and--.

In col. 30, line 38, after "websites;" insert --and--.

In col. 30, line 41, after "The method of" insert --claim--.

In col. 30, line 44, after "The method of" insert --claim--.

In col. 30, line 48, after "The method of" insert --claim--.

In col. 30, line 56, after "web-pages" insert --of--.

In col. 31, line 23, delete "web site" and insert therefor --website--.

In col. 31, line 25, delete "web site" and insert therefor --website--.

In col. 31, line 39, after "websites;" insert --and--.

In col. 32, line 14, after "processor;" insert --and--.

In col. 32, line 25, delete "website; and" and insert therefor --website;--.

Signed and Sealed this  
Seventeenth Day of September, 2013

Teresa Stanek Rea  
*Deputy Director of the United States Patent and Trademark Office*